(12) United States Patent
Swift et al.

(10) Patent No.: US 12,388,246 B2
(45) Date of Patent: Aug. 12, 2025

(54) HIGH-AMPERAGE TRACK BUSWAY

(71) Applicant: Starline Holdings, LLC, Canonsburg, PA (US)

(72) Inventors: Mark A. Swift, Butler, PA (US); Lucas A. Andrews, Clinton, PA (US); Joseph M. Minard, Washington, PA (US); Kacie M. Long, Upper St. Clair, PA (US); David P. Marple, Canonsburg, PA (US); Andrew A. Sulik, Pittsburgh, PA (US); Frank J. Stifter, Jr., Bridgeville, PA (US); Madhav P. Mishra, Canonsburg, PA (US); John D. Berenbrok, Beaver, PA (US)

( * ) Notice: Subject to any disclaimer, the term of this patent is extended or adjusted under 35 U.S.C. 154(b) by 0 days.

(21) Appl. No.: 18/924,988

(22) Filed: Oct. 23, 2024

(65) Prior Publication Data

US 2025/0132549 A1   Apr. 24, 2025

Related U.S. Application Data

(60) Provisional application No. 63/592,459, filed on Oct. 23, 2023.

(51) Int. Cl.
*H02G 5/02* (2006.01)
*H01R 25/14* (2006.01)

(52) U.S. Cl.
CPC .......... *H02G 5/025* (2013.01); *H01R 25/142* (2013.01)

(58) Field of Classification Search
None
See application file for complete search history.

(56) References Cited

U.S. PATENT DOCUMENTS

| | | | | |
|---|---|---|---|---|
| 2,585,770 | A * | 2/1952 | Hammerly | H02G 5/08 361/675 |
| 3,818,417 | A * | 6/1974 | Koenig | H02G 5/08 174/68.2 |
| 5,760,339 | A * | 6/1998 | Faulkner | H02G 5/007 174/88 B |
| 6,521,837 | B2 * | 2/2003 | Hilgert | H02G 3/0608 174/70 B |
| 6,762,362 | B1 * | 7/2004 | Cavanaugh | H05K 7/1457 174/68.2 |
| 8,258,404 | B2 * | 9/2012 | Latimer | H02G 5/005 174/149 R |
| 2002/0117322 | A1 * | 8/2002 | Hilgert | H02G 3/0608 174/99 B |
| 2014/0293516 | A1 * | 10/2014 | Swift | H02B 1/04 248/65 |
| 2014/0315401 | A1 * | 10/2014 | Blasbalg | H02B 1/06 174/149 B |

* cited by examiner

Primary Examiner — Krystal Robinson

(57) ABSTRACT

Devices and systems for bus duct, busbars, and busways for high-amperage applications are described. An example assembly may include a first conductor assembly. The assembly also includes two or more electrical bar trunks. The two or more electrical bar trunks are each either a distribution bar or a transportation bar. The two or more electrical bar trunks are electrically connected to the first conductor assembly at a first end of each of the two or more electrical bar trunks. The assembly further includes a second conductor assembly. Each of the two or more electrical bar trunks are electrically connected to the second conductor assembly at a second end of each of the two or more electrical bar trunks.

14 Claims, 21 Drawing Sheets

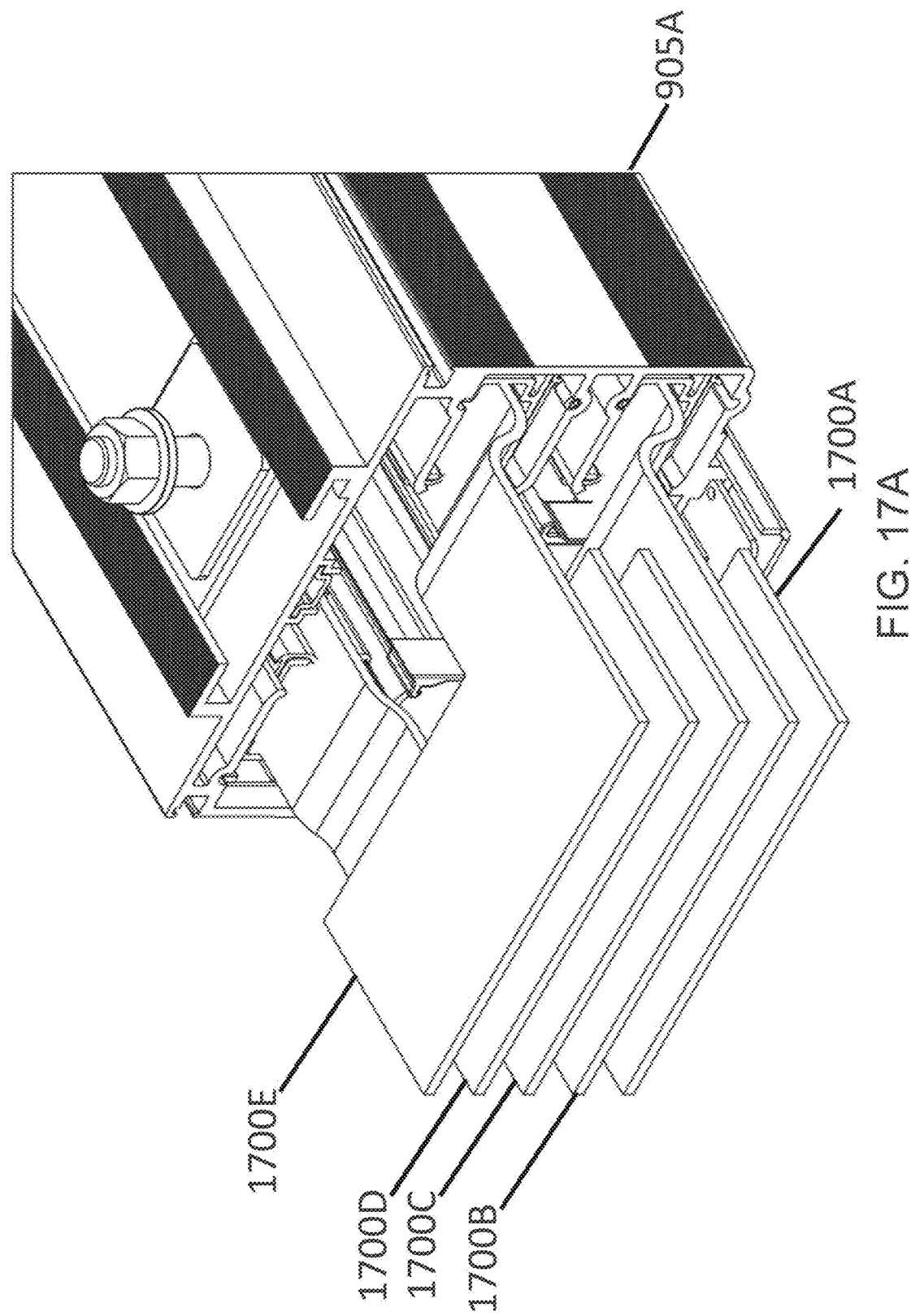

US 12,388,246 B2

HIGH-AMPERAGE TRACK BUSWAY

CROSS-REFERENCE TO RELATED APPLICATION

This application claims priority to U.S. Application No. 63/592,459, filed on Oct. 23, 2023, entitled HIGH-AMPERAGE TRACK BUSWAY, the contents of the application stated herein is hereby incorporated in its entirety.

TECHNICAL FIELD

This document generally relates to electric power distribution, and more particularly, to track or continuous access busways for high-amperage applications.

BACKGROUND

Electrical power distribution, or busway, systems are used to distribute electrical power throughout buildings, particularly commercial or industrial type buildings. Generally, a busway includes a number of busway sections which are connected to one another by busway joints. Each busway section includes a housing that encloses multiple busbars which may be phase busbars, neutral busbars, or ground busbars depending on the particular application.

BRIEF SUMMARY

In some aspects, the techniques described herein relate to a high-amperage busbar assembly, the assembly including: a first conductor assembly; two or more electrical bar trunks, wherein the two or more electrical bar trunks are each either a distribution bar or a transportation bar, wherein the two or more electrical bar trunks are electrically connected to the first conductor assembly at a first end of each of the two or more electrical bar trunks; and a second conductor assembly, wherein each of the two or more electrical bar trunks are electrically connected to the second conductor assembly at a second end of each of the two or more electrical bar trunks.

In some aspects, the techniques described herein relate to an assembly, wherein the two or more electrical bar trunks are connected to one another in parallel.

In some aspects, the techniques described herein relate to an assembly, wherein each of the first conductor assembly the second conductor assembly are sized to receive two electrical bar trunks.

In some aspects, the techniques described herein relate to an assembly, wherein each of the first conductor assembly the second conductor assembly are sized to receive two electrical bar trunks.

In some aspects, the techniques described herein relate to an assembly, wherein at least one of the two or more electrical bar trunks are a distribution bar.

In some aspects, the techniques described herein relate to an assembly, wherein the distribution bar is an open channel distribution trunk.

In some aspects, the techniques described herein relate to an assembly, further including one or more powered unit attached to the distribution bar between the first conductor assembly and the second conductor assembly.

In some aspects, the techniques described herein relate to an assembly, further including one or more joint adapter blade connecting the first conductor assembly to the two or more electrical bar trunks.

In some aspects, the techniques described herein relate to an assembly, wherein at least one of the first conductor assembly or the second conductor assembly is attached to another busbar assembly.

In some aspects, the techniques described herein relate to an assembly, wherein the assembly is rated for at least 1600A.

In some aspects, the techniques described herein relate to a method of manufacturing a high-amperage busbar assembly, the method including: providing a first conductor assembly; electrically connecting two or more electrical bar trunks to the first conductor assembly, wherein the two or more electrical bar trunks are each either a distribution bar or a transportation bar, wherein the two or more electrical bar trunks are electrically connected to the first conductor assembly at a first end of each of the two or more electrical bar trunks; and electrically connecting a second conductor assembly to the two or more electrical bar trunks, wherein each of the two or more electrical bar trunks are electrically connected to the second conductor assembly at a second end of each of the two or more electrical bar trunks.

In some aspects, the techniques described herein relate to a method, wherein the two or more electrical bar trunks are connected to one another in parallel.

In some aspects, the techniques described herein relate to a method, wherein each of the first conductor assembly the second conductor assembly are sized to receive two electrical bar trunks.

In some aspects, the techniques described herein relate to a method, wherein each of the first conductor assembly the second conductor assembly are sized to receive two electrical bar trunks.

In some aspects, the techniques described herein relate to a method, wherein at least one of the two or more electrical bar trunks are a distribution bar.

In some aspects, the techniques described herein relate to a method, wherein the distribution bar is an open channel distribution trunk.

In some aspects, the techniques described herein relate to a method, further including attaching one or more powered unit to the distribution bar between the first conductor assembly and the second conductor assembly.

In some aspects, the techniques described herein relate to a method, further including connecting one or more joint adapter blade to the first conductor assembly to the two or more electrical bar trunks.

In some aspects, the techniques described herein relate to a method, wherein at least one of the first conductor assembly or the second conductor assembly is attached to another busbar assembly.

In some aspects, the techniques described herein relate to a method, wherein the assembly is rated for at least 1600A.

BRIEF DESCRIPTION OF THE DRAWINGS

The present disclosure is illustrated and described herein with reference to the various drawings, in which like reference numbers denote like method steps and/or system components, respectively, and in which:

FIGS. 17A and 17B illustrate the joint adapter blades installed into a first distribution bar (FIG. 17A) and individually (FIG. 17B), in accordance with various embodiments of the present disclosure;

DETAILED DESCRIPTION

Figure 2:
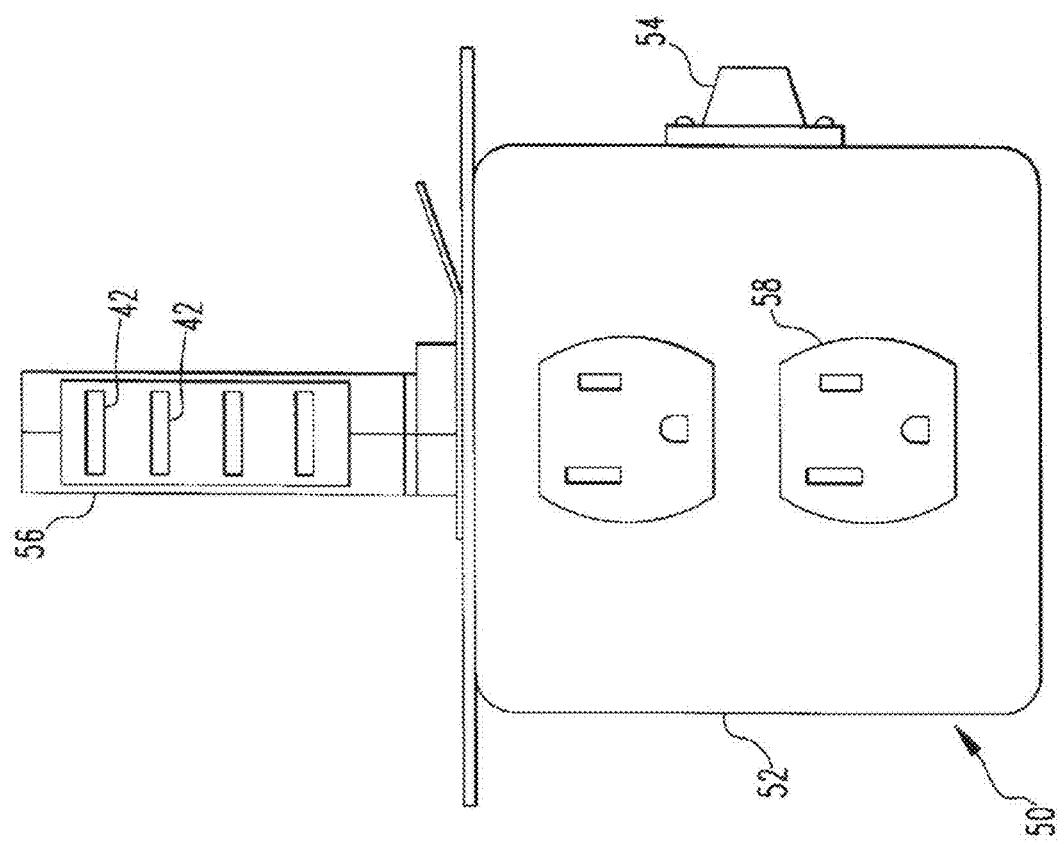
FIG. 2 illustrates an example plug-in unit, in accordance with various embodiments of the present disclosure.

The present disclosure may be understood more readily by reference to the following detailed description of the disclosure taken in connection with the accompanying drawing figures, which form a part of this disclosure. It is to be understood that this disclosure is not limited to the specific devices, methods, conditions or parameters described and/or shown herein, and that the terminology used herein is for the purpose of describing particular embodiments by way of example only and is not intended to be limiting of the claimed disclosure. Any and all patents and other publications identified in this specification are incorporated by reference as though fully set forth herein.

Also, as used in the specification including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

Electrical distribution systems, for lighting and other power requirements, often include mounted busways to which lighting fixtures, power outlets and the like may be attached. In a typical system the busways comprise elongated housings having a downward opening and containing the necessary conductors and insulation. Various output devices can be physically attached to a housing at any point along its length, and such output devices have portions which extend upwardly into the housing and make connections with the conductors housed therein. Such busway systems are desirable in that they are relatively easy to install and modify, and provide a high degree of flexibility in the location and re-location of output devices, such as lighting fixtures and power output devices.

Embodiments of the disclosed technology are directed to flexible, scalable, and reliable power distribution for high-amperage applications, which include data centers, mission-critical facilities, retail establishments, manufacturing plants, and/or the like.

Originally, high amperage power distribution systems were typically cable bus systems that are installed in overhead cable trays or underneath a raised floor, with the underfloor area housing whips and cables that supply the high amperage power to multiple devices (e.g., server racks). For example, the implementation described in U.S. Pat. No. 10,141,731 includes an underground portion in which the cable bus is installed in the encasement that is uniquely offset vented or power cooled to meet the cable high amperage requirements. However, this traditional underfloor method suffers from several drawbacks, including the fact that raised floors are costly; maintenance is required to remove unused cables, which tend to be abandoned; the risk of human error while working with circuit breakers and cables that are not clearly associated with a given load; the overall weight of traditional cables used for these applications; and unclear and/or lower short-circuit withstand values.

Additionally, traditional bus duct systems have been available to deliver high-ampacity power distribution in a myriad of applications, including industrial facilities, commercial and office building, electrical generation plants, and grey space data center installations. These products typically range from 600-6300A, but are predominantly designed to connect various equipment together electrically, or for distribution in less dense environments. The bus duct systems have fixed locations for tapping off power, which limits the number of connections available within a given bus duct section. However, with increasing plug-in density requirements being needed to meet specific equipment loading, traditional bus ducts cannot meet the number of taps needed in a given bus duct length to deliver adequate connections.

Existing systems that have incorporated busways support amperages that range from 20-30A (see, for example, U.S. Pat. No. 7,744,386) to 100-1200A (see, for example, U.S. Pat. No. 9,438,014). But these amperages are not high enough to support the increasing needs of data centers, mission-critical facilities, and manufacturing plants. Embodiments of the disclosed technology are rated to support 1600-6300A, and provide the flexibility, scalability, and reliability of busway systems, which mitigate the drawbacks and limitations of the methods discussed above.

Figure 1:
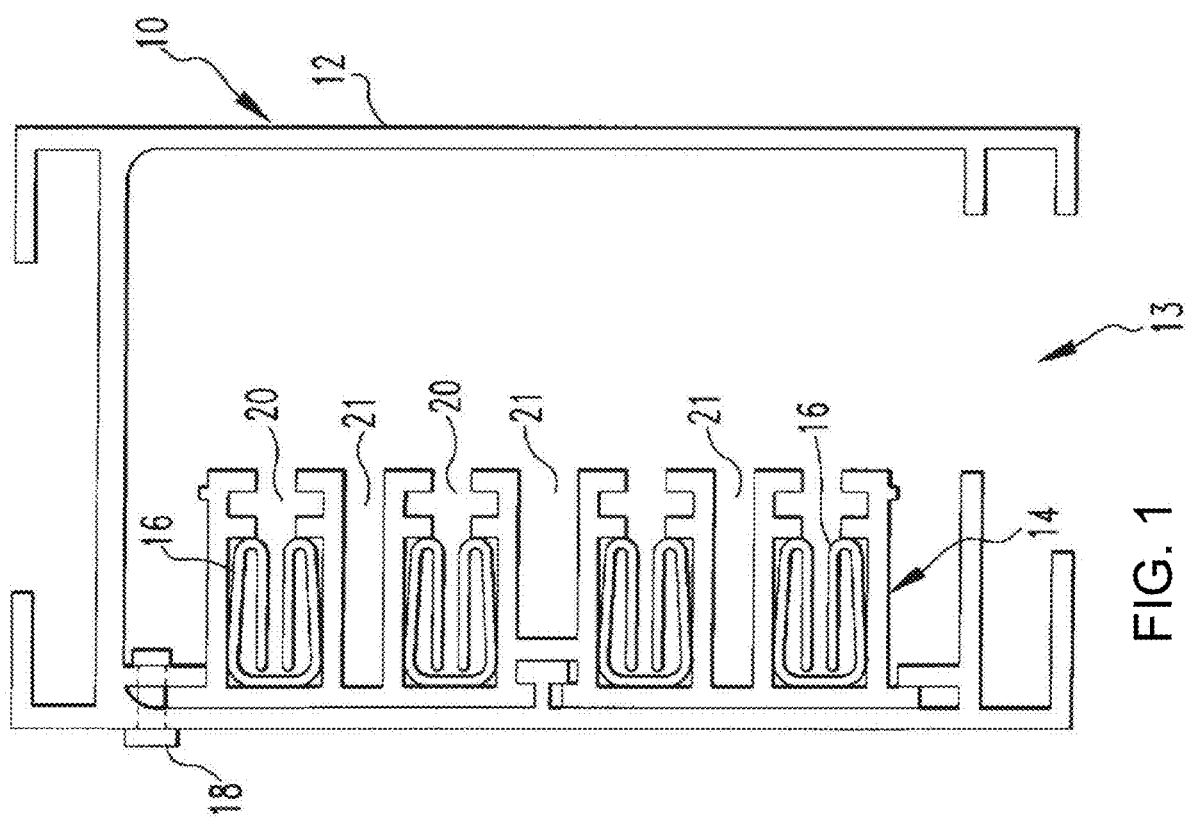
FIG. 1 illustrates a cross-section of an example electrical power distribution track, in accordance with various embodiments of the present disclosure.

FIG. 1 illustrates a cross-section of an electrical power distribution track 10. A busway may include several track sections 10 which are joined end-to-end to make the distribution system. Each track section 10 is typically up to 20 feet in length and any number of sections may be joined to form long runs of busways for power distribution. Plug-in units (e.g., as shown in FIG. 2) can be installed at any point along the busway except at the coupling between adjacent sections of the track.

In some embodiments, each section of the track 10 includes an enclosure 12 which is a channel-shaped aluminum extrusion. The enclosure 12 may be attached to a ceiling, wall or the like and is typically disposed with the mouth or access slot 13 to the channel, which is open downwardly as shown in FIG. 1. The track 10 further includes an insulative support 14 secured in the enclosure 12 and a plurality (typically 3 or 4) of electrically conductive busbars 16 in the insulative support. In an example, the busbars 16 in track 10 have a unique configuration that provides firm contact pressure and a large contact surface area with stabs on take-off devices that can be inserted into the track 10 at almost any point along the length of the track.

In some embodiments, the busbar 16 is made of copper strip material that may be tempered to be approximately half hard so as to be resilient or spring-like. The copper strip may be about 0.010 to 0.125 inch thick. In an example, the copper strip is about 0.030 to 0.050 inch thick. In another example, the copper is about 0.040 inch thick. In other embodiments, an aluminum strip may also be used in place of copper.

Figure 3:
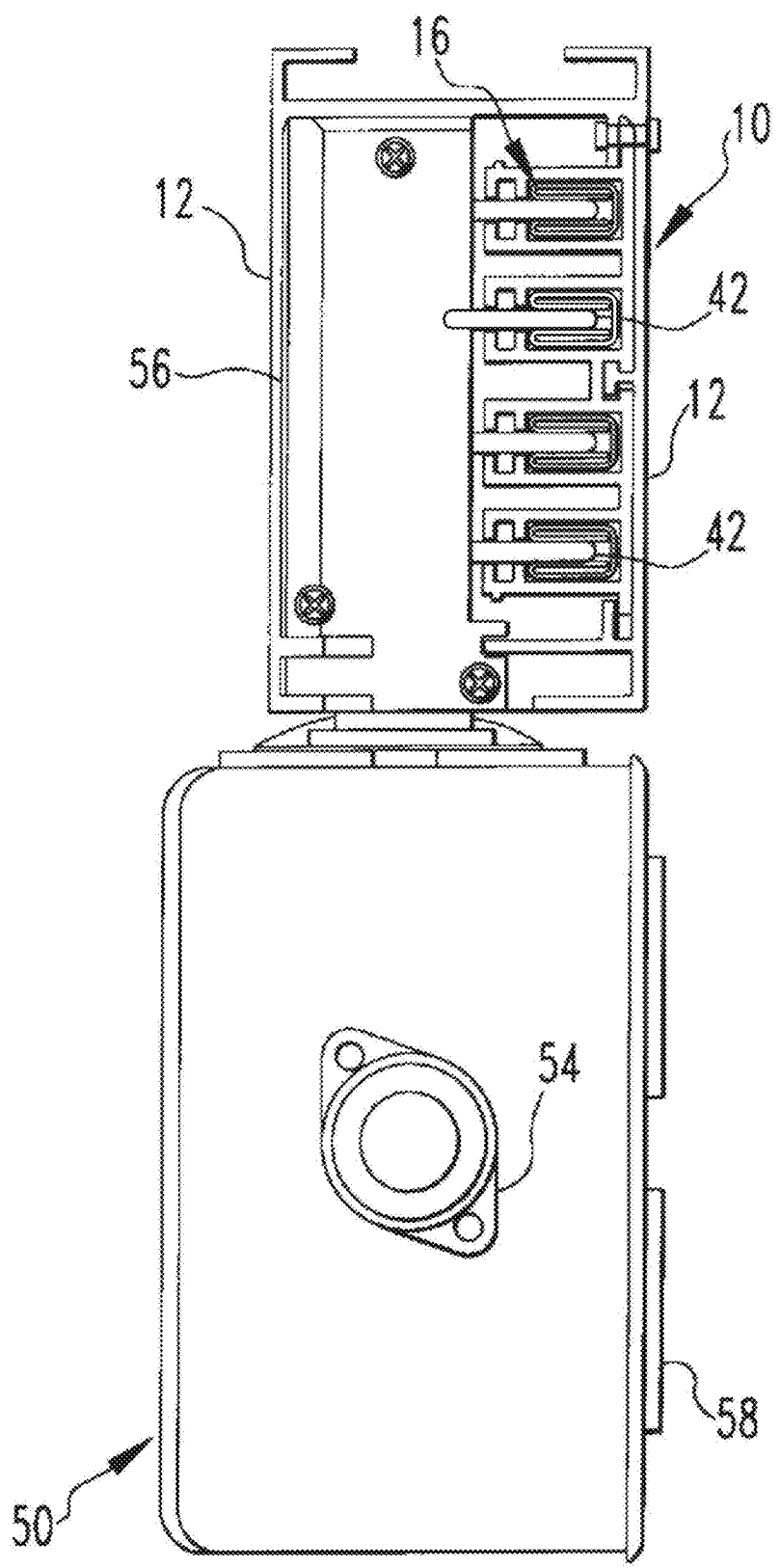
FIG. 3 illustrates a plug-in unit engaged with an electrical power distribution track, in accordance with various embodiments of the present disclosure.

FIG. 2 illustrates an example plug-in unit 50, sometimes also referred to as a tap box. As shown therein, the plug-in unit 50 may include an enclosure 52, an overcurrent protection device 54, electrical outlets 58, a paddle 56 and multipole conductive stabs 42 on the paddle for making electrical contact with busbars 16 in a track 10. The plug-in unit 50 can be inserted in a track 10, as shown in FIG. 3, at almost any point along its length by inserting paddle 56 into the open mouth of the enclosure 12 and rotating the device 90 degrees clockwise, for example. Hanger bolts, not shown in FIG. 2, may be used to secure the device 50 in the track 10. In some embodiments, the paddle 56 is rated for 160A and the multipole conductive stabs are rated for 250A.

The embodiments shown in FIGS. 1-3 are further detailed in U.S. Pat. No. 6,039,584, which is incorporated, in its entirety, as part of this document.

Figure 4A:
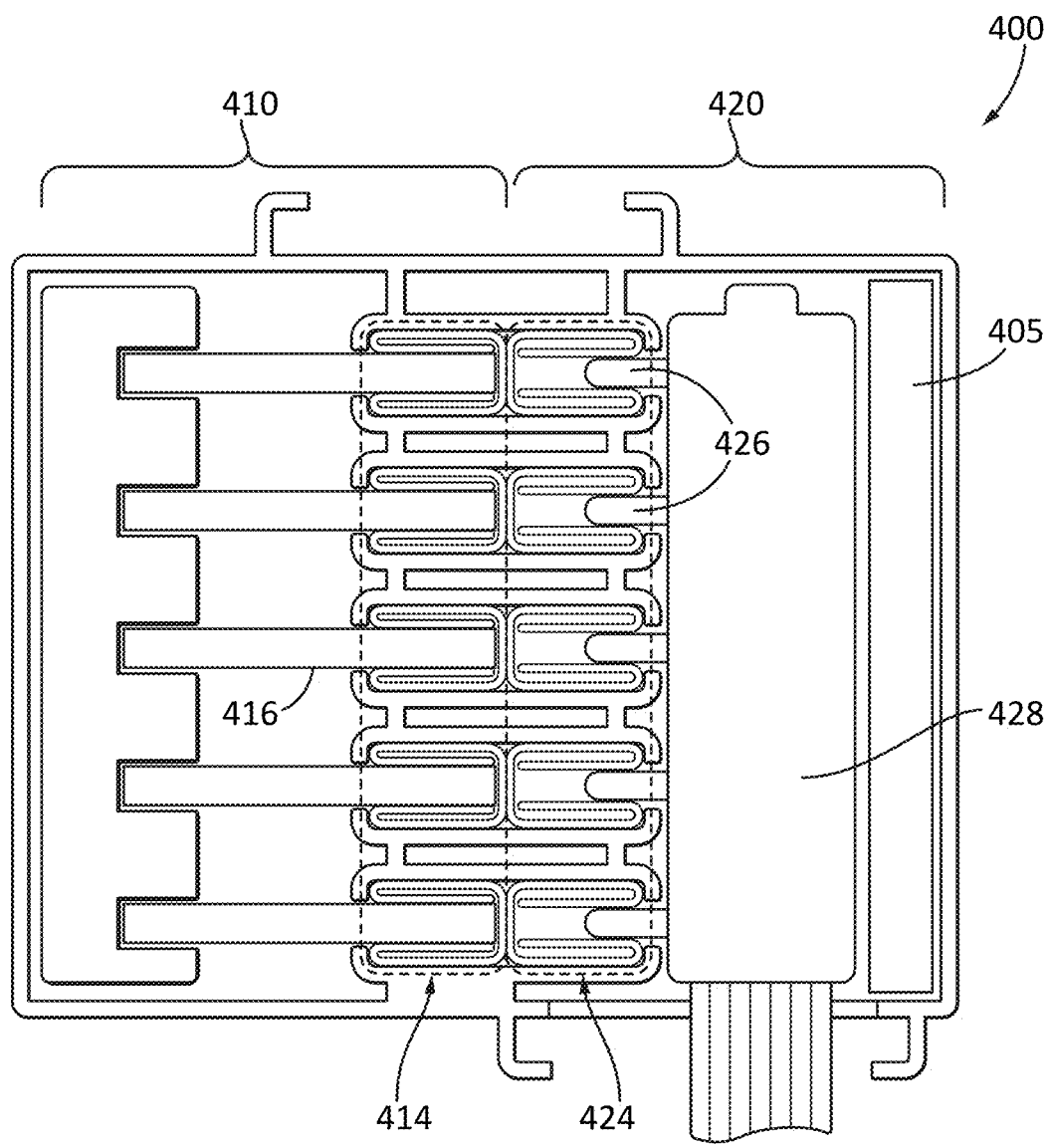
FIGS. 4A and 4B illustrate a cross-section of a high-amperage track busway, in accordance with various embodiments of the present disclosure.
Figure 4B:
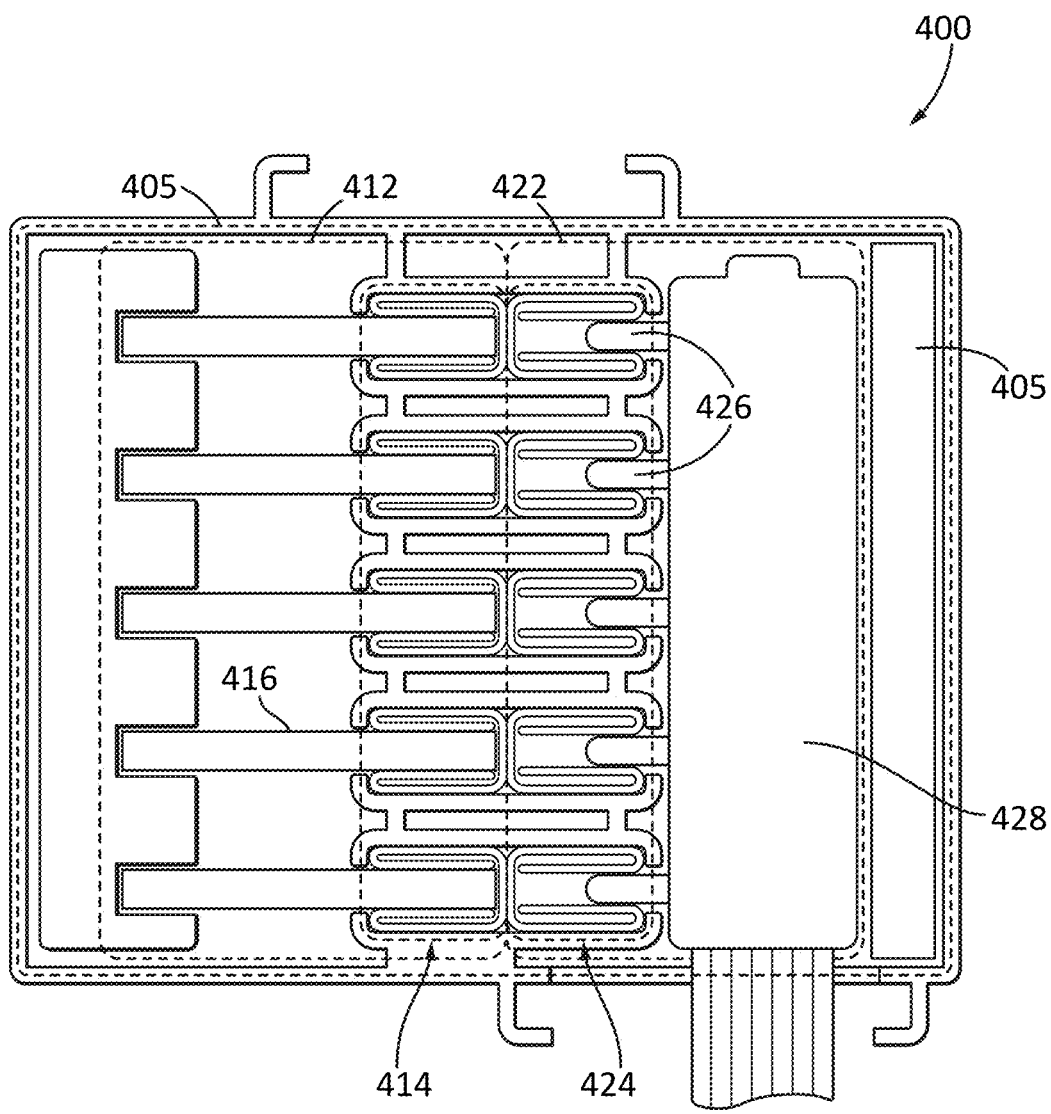

FIGS. 4A and 4B show a cross-sectional view of an example high-amperage busway 400, in accordance with the disclosed technology. The high-amperage busway 400 shown in FIG. 4A includes a trunking bus 410 that horizontally abuts a continuous access busway 420. The trunking bus 410 includes multiple busbars (e.g., first inner components 414), each of which is adapted to engage one end of a compressed flat trunking conductor 416 (or plate). The other end of the compressed flat trunking conductor 416 is connected, but electrically isolated, to the outer enclosure (e.g., outer component 405) of the high-amperage busway 400. The continuous access busway 420 also includes multiple busbars (e.g., second inner component 424), each of which is adapted to engage a stab member 426 of a plug-in unit 428 (e.g., the plug-in unit 50 shown in FIG. 2). In some embodiments, the continuous access busway 420 may include one or more sections of the electrical power distribution track shown in FIG. 1.

FIG. 4B shows the high-amperage busway 400 comprising an outer component 405, which includes a first cavity 412 (corresponding to the trunking bus 410) and a second cavity 422 (corresponding to the continuous access busway 420) that horizontally abuts the first cavity 412. The first cavity 412 includes a first inner component 414 that comprises multiple busbars, each of which is adapted to engage one end of a compressed flat trunking conductor 416 (or plate). The second cavity 422 includes a second inner component 424 that also comprises multiple roll-formed or spring contact busbars, and in the second cavity 422, each of the multiple roll-formed busbars is adapted to engage a stab member 426 of a plug-in unit 428, as shown in FIG. 4B.

In the embodiments shown in FIGS. 4A and 4B, the trunking bus safely and reliably carries a high-amperage current, the first inner component 414 and the second inner component 424 are electrically coupled to relay the current from the trunking bus 410 to the continuous access busway 420, and the plug-in unit 428 is configured to feed the current to the devices connected thereto. In an example, the first inner component 414 and the second inner component 424 are electrically coupled by being physically connected to each other. In another example, the first inner component 414 and the second inner component 424 are electrically coupled via an electrically conductive bar that connects the trunking bus to the continuous access busway.

Figure 5:
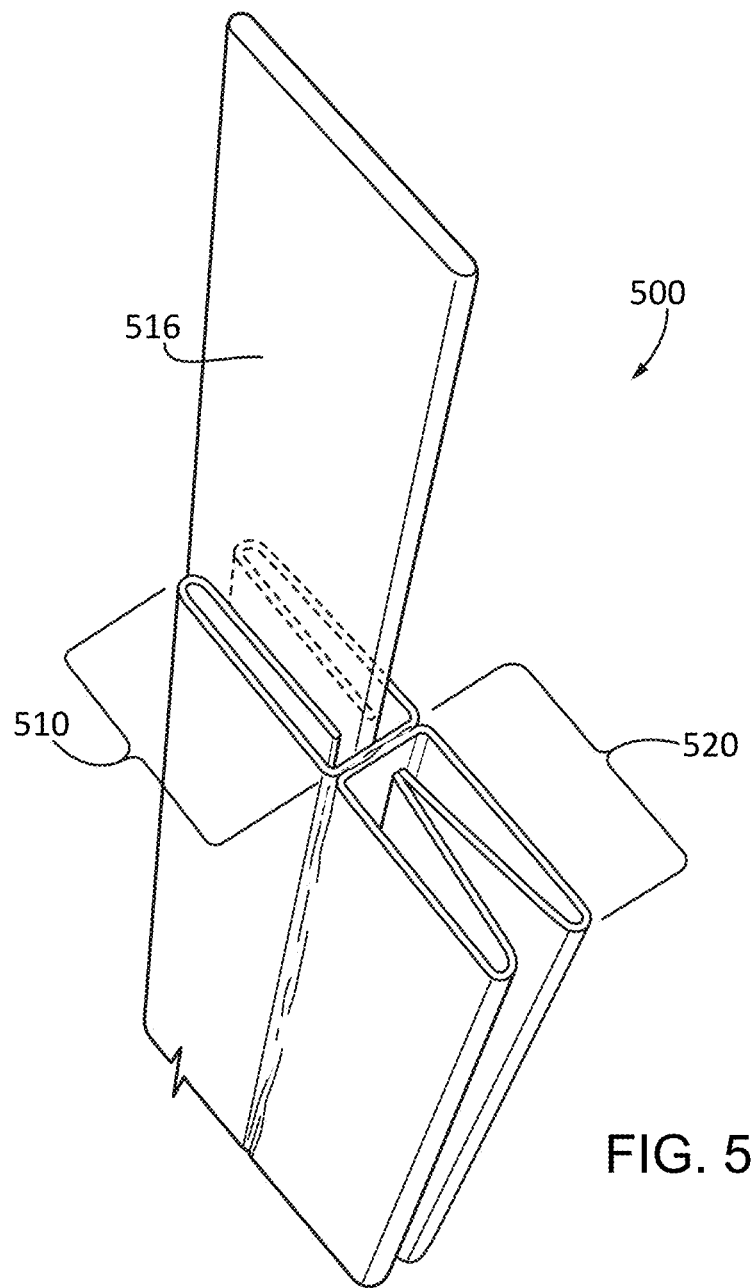
FIG. 5 illustrates a structural prototype of the high-amperage track busway, in accordance with various embodiments of the present disclosure.
Figure 6:
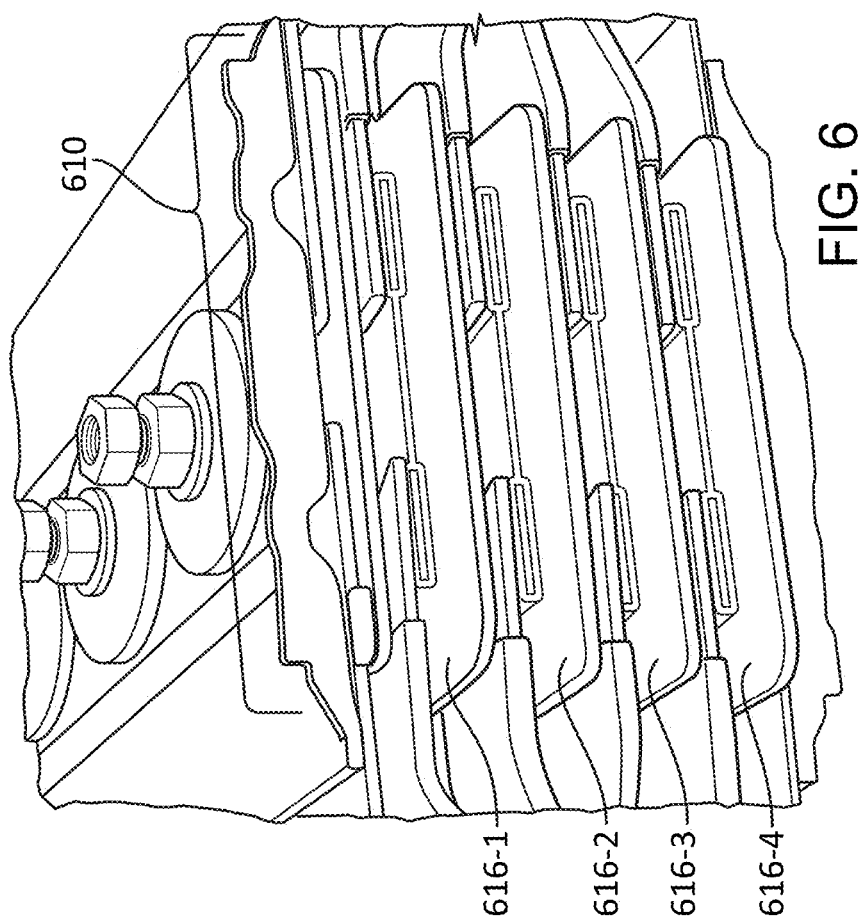
FIG. 6 illustrates an example of a high-amperage trunking bus and joint pack with continuous access busway functionality, in accordance with various embodiments of the present disclosure.

FIG. 5 shows a structural prototype of the high-amperage busway 500 whose cross-section is illustrated in FIGS. 4A and 4B. As shown therein, the structural equivalent of the high-amperage busway 500 includes the structural equivalent of a trunking bus 510, similar to the bus duct products described earlier, and the structural equivalent of a continuous access busway 520. The trunking bus 510 includes a metal strip that is representative of a compressed flat conductor (or plate) 516. An example of a functional trunking bus 610 is shown in FIG. 6, and includes multiple conducting strips (or plates) 616-1, 616-2, 616-3, and 616-4. In some embodiments, a conducting strip is formed from copper or aluminum, and may be coated with tin or epoxy.

Figure 7:
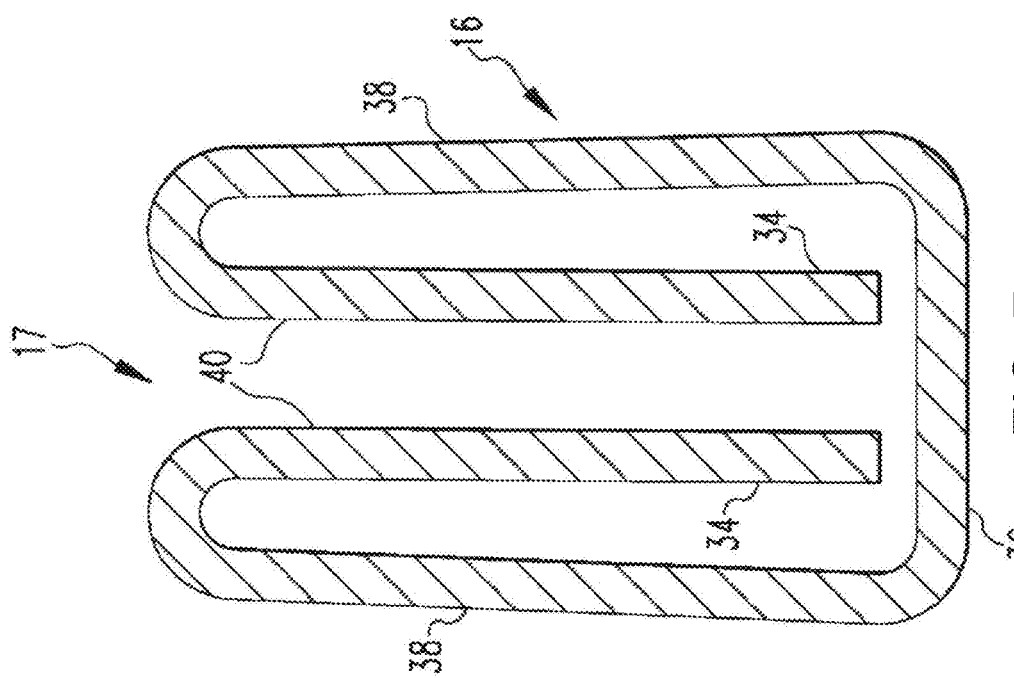
FIG. 7 illustrates an example busbar used in the high-amperage track busway, in accordance with various embodiments of the present disclosure.

FIG. 7 illustrates an example busbar used in the high-amperage busway. As shown therein, the busbar 16 is generally U-shaped with a slot opening 17 and a pair of substantially parallel, resilient (spring-like) interior flanges 34 for establishing pressure contact with a stab on the plug-in unit. The cross-section of the busbar 16 may include a base portion 36 with two legs 38 projecting from the base, and with the interior re-entrant flanges 34 extending rearward toward the base portion 36.

With reference again to FIG. 1, the channels 20 in the support member 14 and the busbars 16 are dimensioned so the busbars will fit snugly in the channels; the slot opening 17 in the busbar 6 is sized to be smaller than the thickness of the stab on a plug-in unit to be inserted into the track. The interior end flanges 34 on the busbar 16, and particularly the interior contact surfaces 40 on the end flanges, are substantially parallel to each other and to the direction of a stab 42 as is seen in FIG. 2. The legs 38 of the busbar 16 preferably slightly converge toward one another from the base 36 of the busbar to the ends of the legs at the end flange connection.

The busbar 16 may thus have a generally trapezoidal shape. The end flanges 34 are free to flex so as to allow the profile to conform to the stab 42 and maintain parallelism of the two contact surfaces 40 on the flanges 34 with contact surfaces 44 on the stab. This freedom of movement is permitted by the resiliency or spring-like nature of the metal of the busbar 16 and the profile of the busbar. The legs 38 can flex relative to the base 36 and the end flanges 34 can flex relative to the legs.

When the stab member of the plug-in unit is inserted into the busbar, the trapezoidal shape of the busbar becomes more rectangular as the upper corners of the slot opening move outward. The contact surfaces on the busbar remains parallel and pressed firmly against the stab due to the flexible nature of the material and the fact that the natural slot opening in the busbar is sized smaller than the stab thickness. This design accommodates some variation between the slot dimension and the stab thickness and still establish good surface contact. Total contact surface area between the stab and the busbar is approximately twice the product of the height of the contact surface portion of the busbar and the width of the stab. In other words, both sides of the stab are in full contact with the parallel contact surfaces of the busbar. Current flows from the busbar to the plug-in unit through this surface area. When the plug-in unit is removed from the busway, the busbar returns to its natural shape. In comparison to existing power distribution systems, this architecture provides firm contact pressure surface and increased contact between the busbars and the stabs of the plug-in unit.

Figure 8:
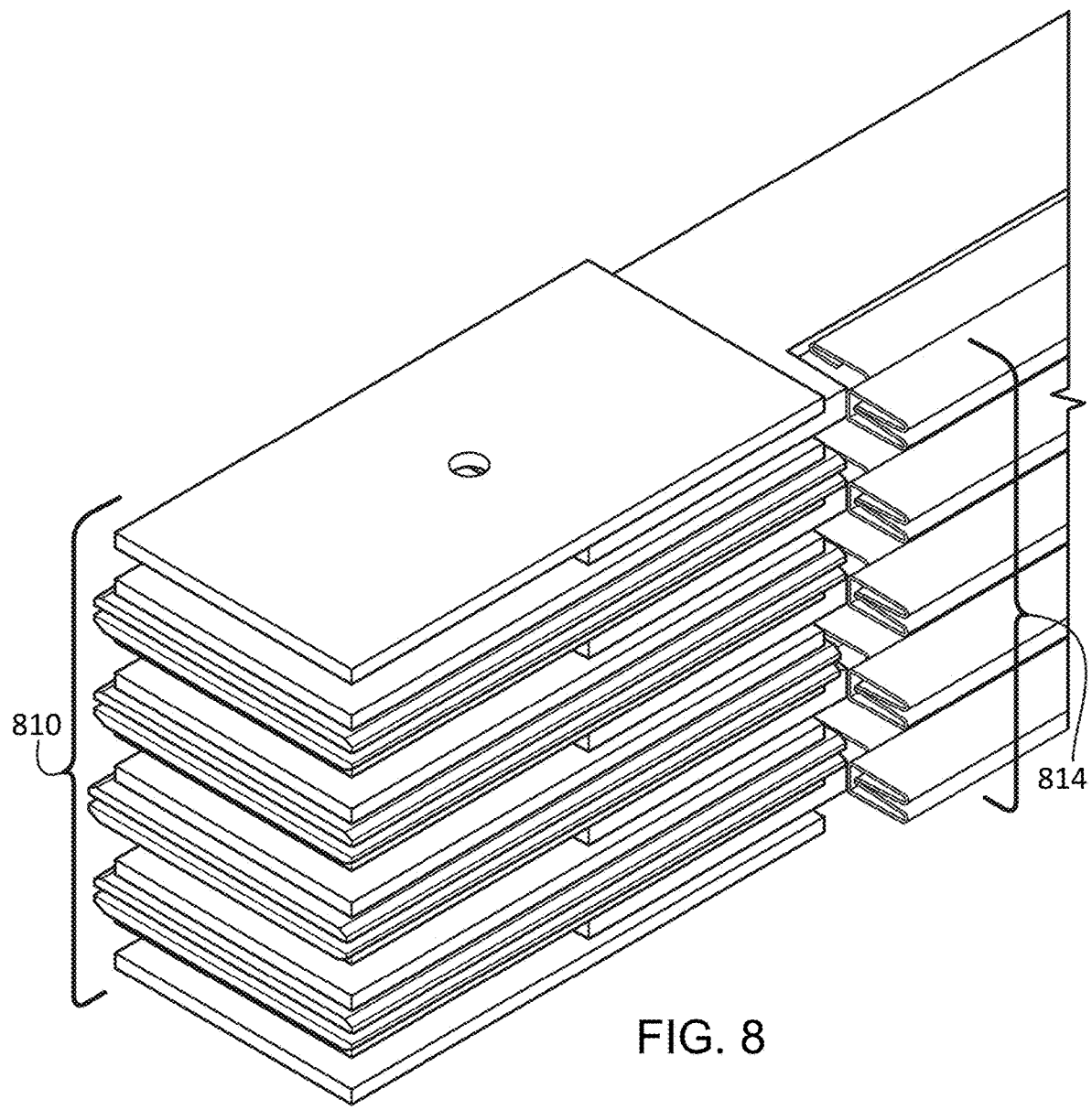
FIG. 8 illustrates a model of an example trunking bus, in accordance with various embodiments of the present disclosure.

FIG. 8 shows a model of an example trunking bus. As shown in the cross-sectional view on the left portion therein, the trunking bus 810 is adjacent and electrically coupled to busbar 814, which can be configured to interface with the continuous access busway (e.g., as described in FIGS. 4A, 4B and 5).

FIGS. 9-19 illustrate various different busway styles in accordance with various embodiments of the present disclosure. The busways discussed in reference to FIGS. 9-19 may use the various features discussed in reference to FIGS. 1-8. As shown in FIGS. 9-19, transportation bar(s) and distribution bar(s) may be interchanged based on the usage of the given busway. As such, the bars (e.g., transportation bar(s) and/or distribution bar(s)) may be positioned to connect conductor assemblies (e.g., two bar conductor assembly 1500, three bar conductor assembly 1550, etc.), as shown. The bar (e.g., transportation bar and/or distribution bar) discussed herein may be a "busbar trunk." For example, a distribution bar may be an open channel distribution busbar trunk and/or a transportation bar may be a sandwich busway type. In various embodiments, the bars are connected in parallel with other bars (e.g., each of the transportation bar(s) and/or distribution bar(s) of FIGS. 9-19 may be in parallel with one another in the same figure).

The various embodiments shown herein may include distribution bar(s) and/or transportation bar(s). The distribution bar(s) (e.g., first distribution bar 905A, second distribution bar 905B, etc.) may be open in order to receive a powered unit (such as the power tap-off unit shown in FIG. 18). The transportation bar(s) (e.g., first transportation bar 1005A, second transportation bar 1005B, etc.) are enclosed, such that no powered unit can be installed between the ends of the busway. For example, a transportation bar may be connected to a conductor assembly at each end, but be otherwise enclosed along the length of the transportation bar, while a distribution bar may be connected to the conductor assemblies at each end, but also be open in order to receive powered units. Various embodiments herein illustrate different configurations of distribution bar(s) and/or transportation bar(s).

Figure 9:
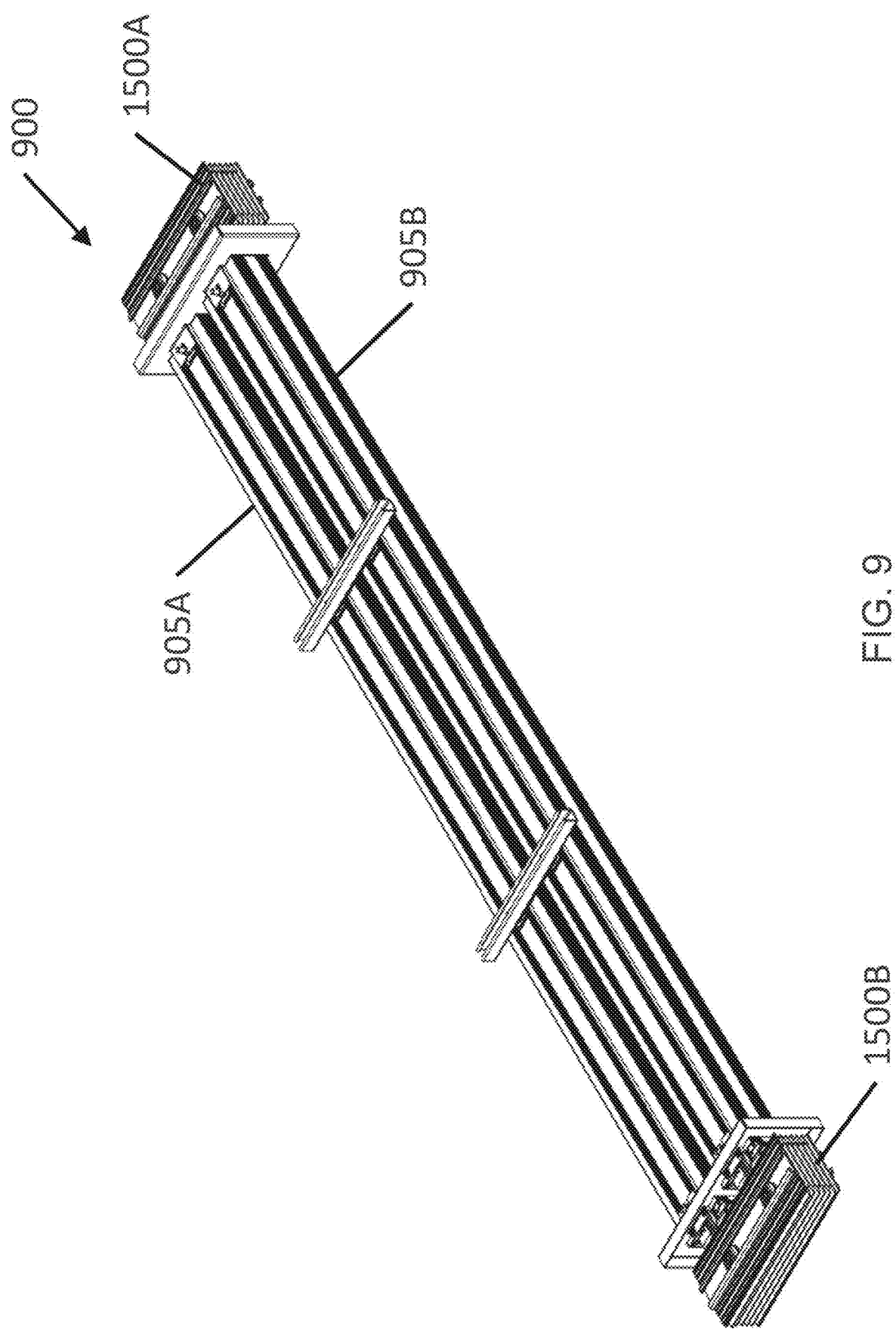
FIG. 9 illustrates a double bar busway with two distribution bars, in accordance with various embodiments of the present disclosure.
Figure 10:
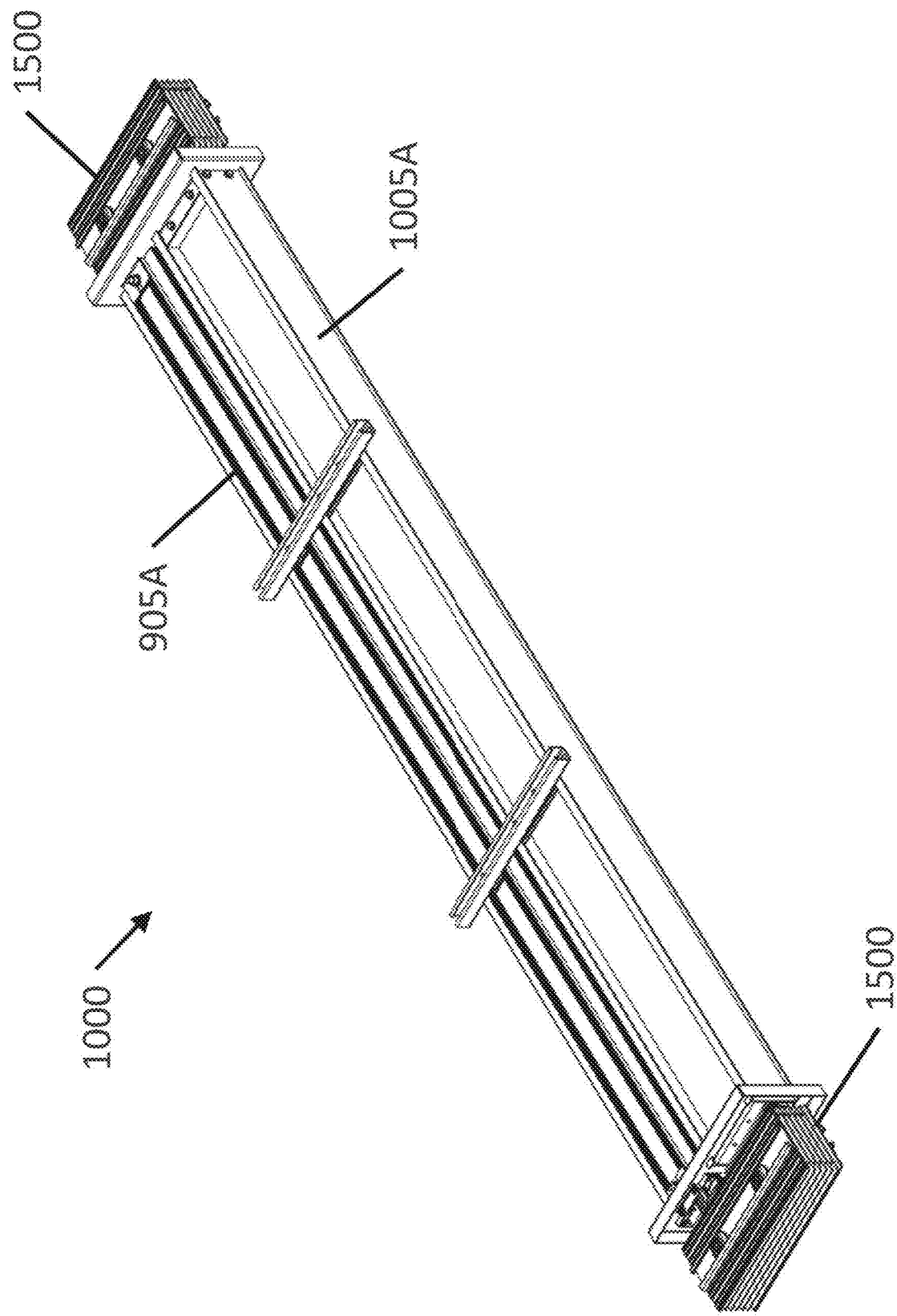
FIG. 10 illustrates a double bar busway with a first distribution bar and a first transportation bar, in accordance with various embodiments of the present disclosure.

FIG. 9 illustrates a double bar busway 900 with a first distribution bar 905A and a second distribution bar 905B, in accordance with various embodiments. A double bar busway (e.g., the double bar busway 900 of FIG. 9, the double bar busway 1000 of FIG. 10, etc.) may include two bars connecting electrical components, such as a conductor assembly. For example, the first distribution bar 905A and the second distribution bar 905B connect a first two bar conductor assembly 1500A and a second two bar conductor assembly 1500B. FIG. 10 illustrates a double bar busway 1000 with a first distribution bar 905A and a first transportation bar 1005A, in accordance with various embodiments. As discussed above, the transportation bar(s) and distribution bar(s) may be interchanged based on the usage of the busway.

Figure 11:
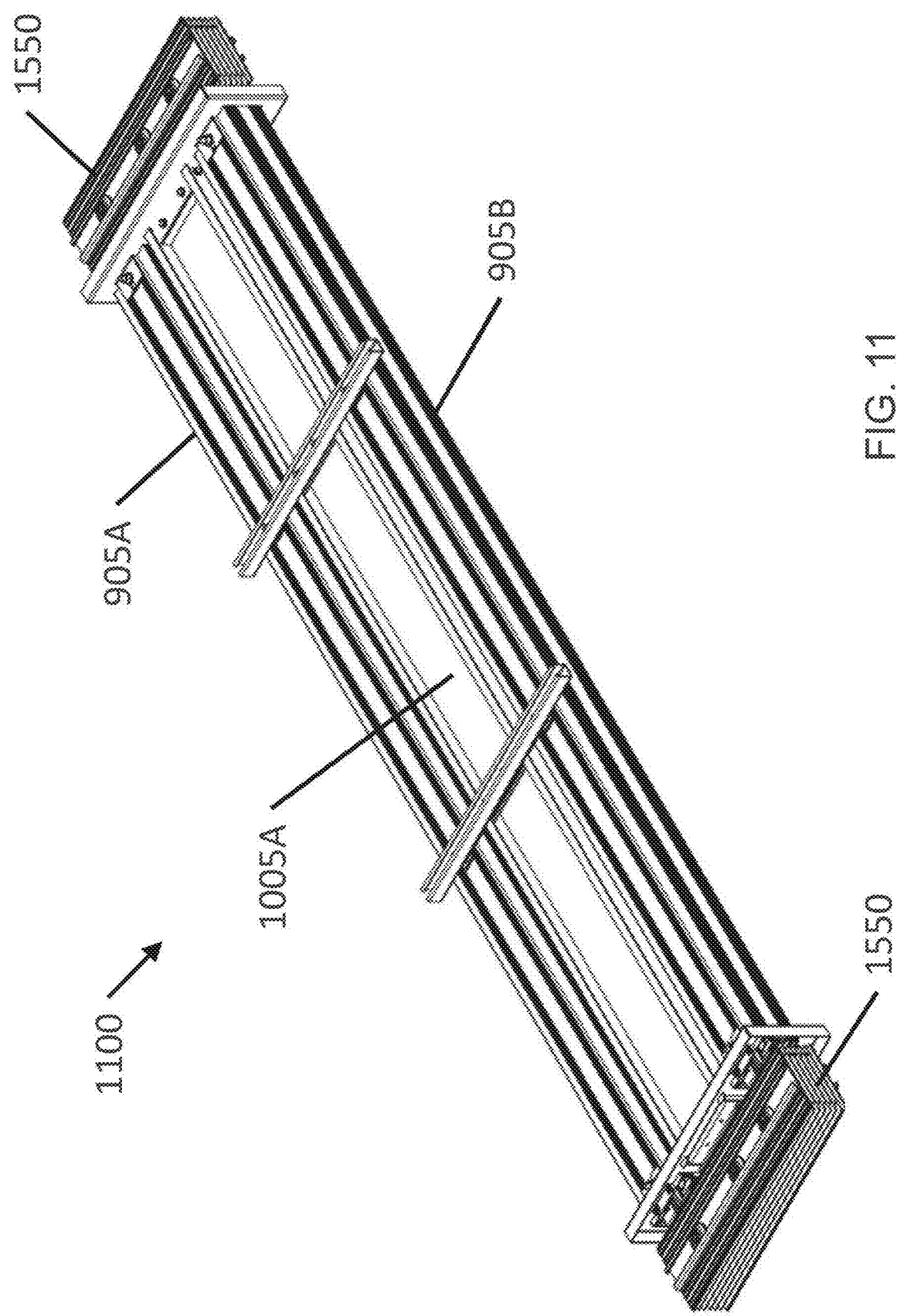
FIG. 11 illustrates a triple bar busway with a first distribution bar, a second distribution bar, and a first transportation bar, in accordance with various embodiments of the present disclosure.
Figure 12:
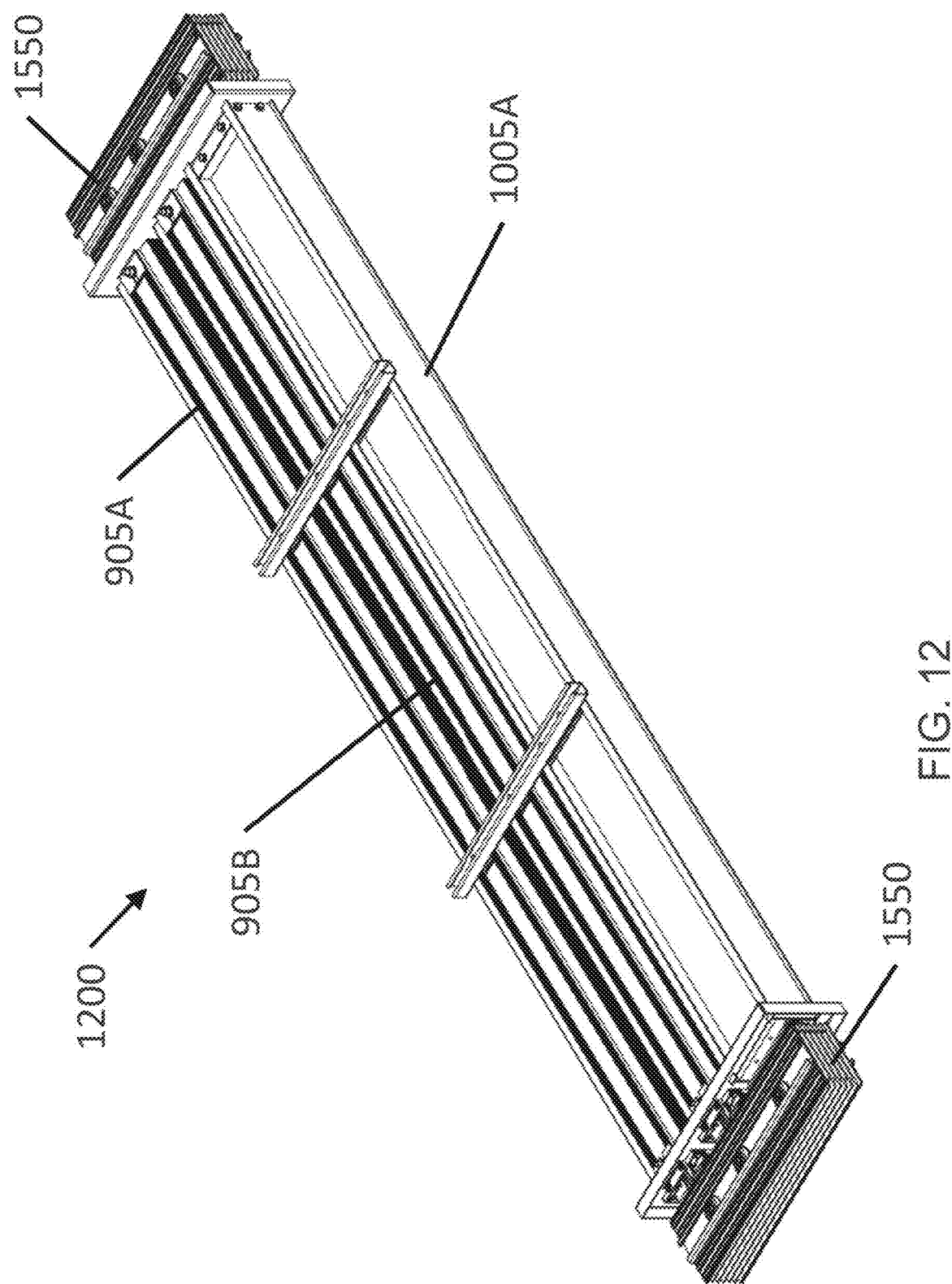
FIG. 12 illustrates a triple bar busway with a first distribution bar, a second distribution bar, and a transportation bar, in accordance with various embodiments of the present disclosure.
Figure 13:
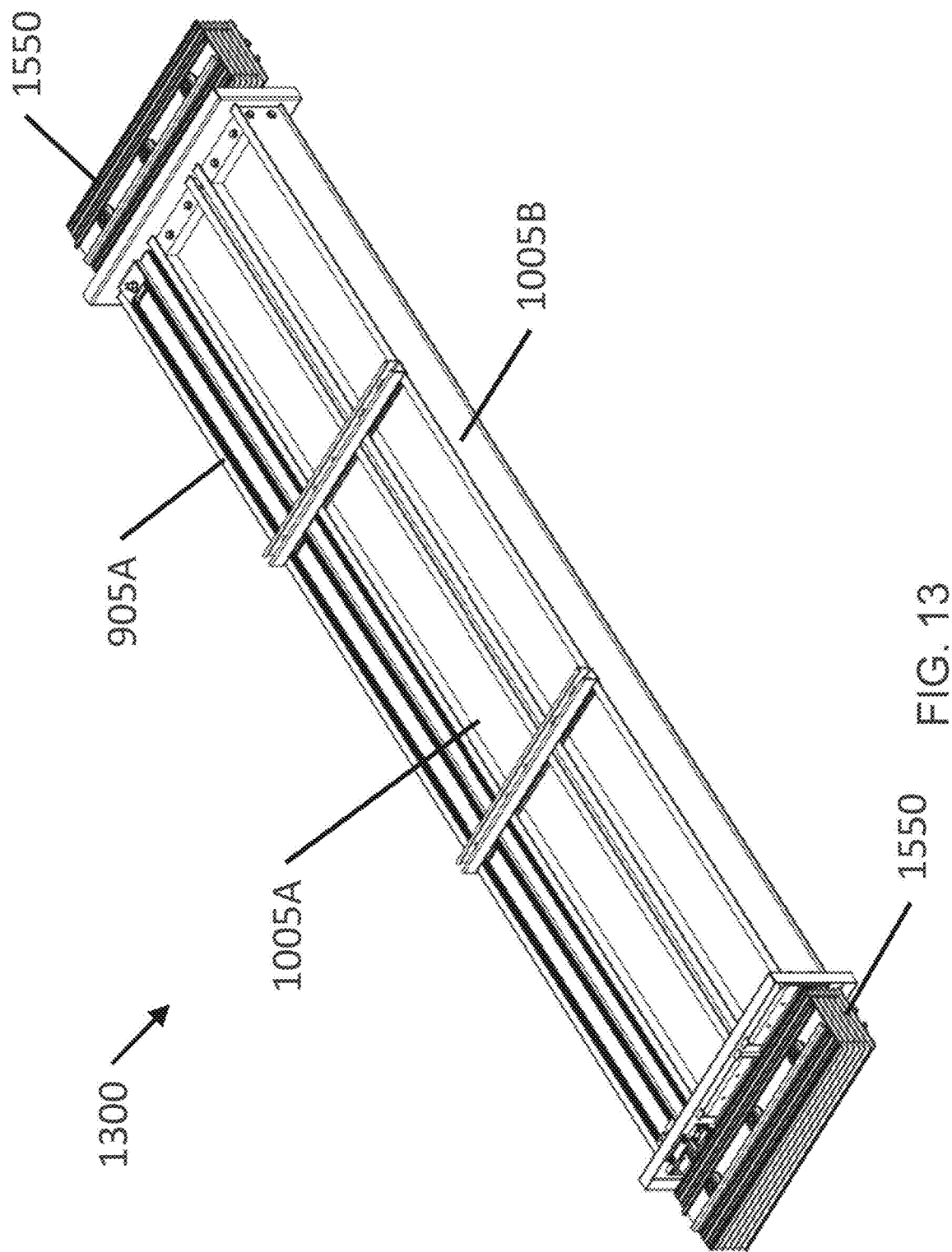
FIG. 13 illustrates a triple bar busway with a first distribution bar, a first transportation bar, and a second transportation bar, in accordance with various embodiments of the present disclosure.
Figure 14:
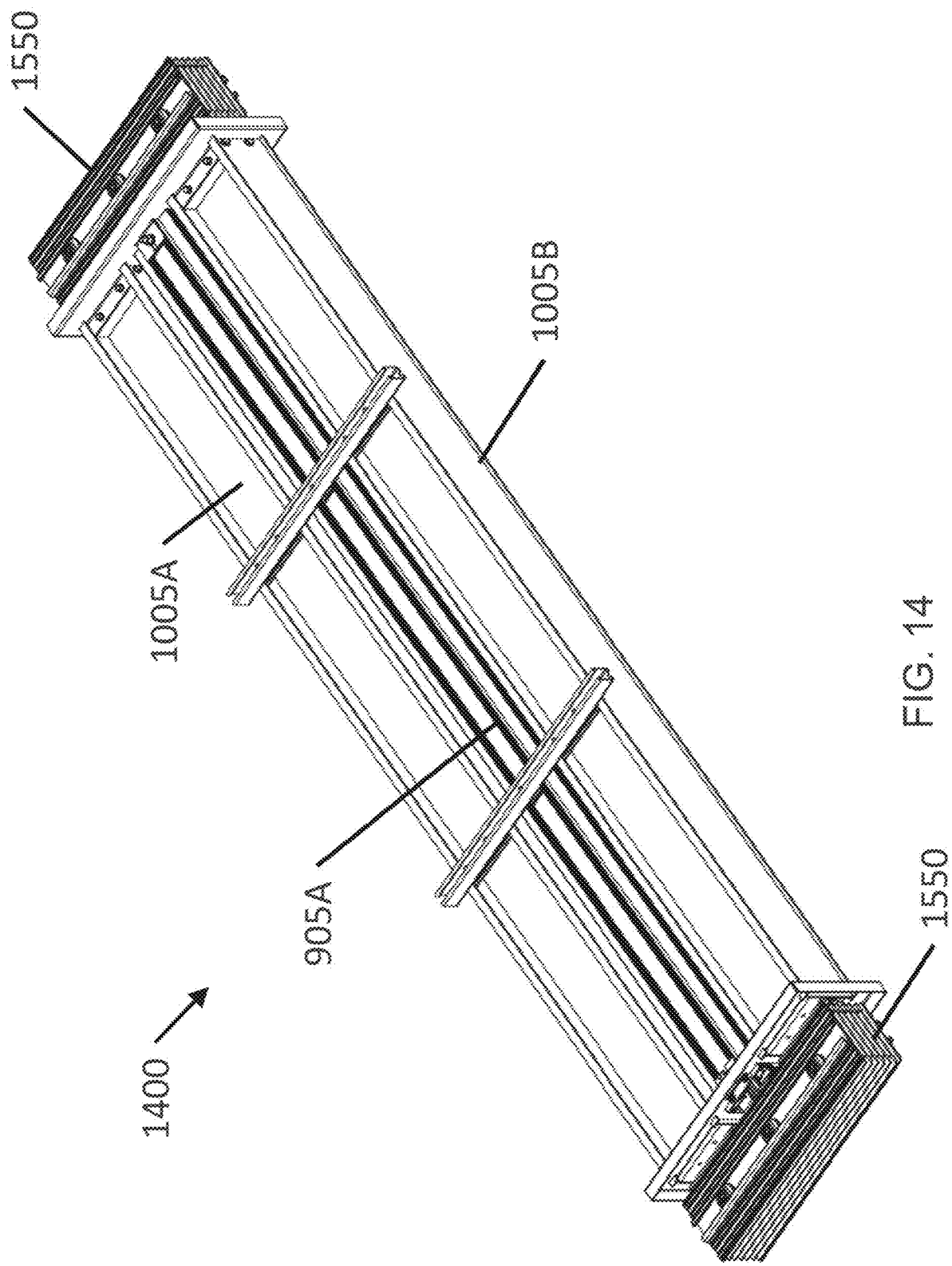
FIG. 14 illustrates a triple bar busway with a first transportation bar, and a first distribution bar, a second transportation bar, in accordance with various embodiments of the present disclosure.

FIG. 11 illustrates a triple bar busway 1100 with a first distribution bar 905A, a second distribution bar 905B, and a first transportation bar 1005A, in accordance with various embodiments. In FIG. 11, the first transportation bar 1005A of FIG. 11 is disposed between the first distribution bar 905A and the second distribution bar 905B. As shown in FIG. 12, the positioning of the different style bars may be changed based on the use case of the busway (e.g., the first distribution bar 905A and the second distribution bar 905B are beside one another in FIG. 12, but are separated by the first transportation bar 1005A in FIG. 11. The configuration may be based on the type of power units (e.g., plug-in units, power tap-off units, etc.) that are used. For example, some power units may have a larger footprint and require distribution bars to be separated. FIGS. 11-14 illustrate various different bar configurations. For example, FIG. 12 illustrates a triple bar busway 1200 with a first distribution bar 905A, a second distribution bar 905B, and a first transportation bar 1005A with the second distribution bar 905B of FIG. 12 being disposed between the first distribution bar 905A and the first transportation bar 1005A;

FIG. 13 illustrates a triple bar busway 1300 with a first distribution bar 905A, a first transportation bar 1005A, and a second transportation bar 1005B with the first transportation bar 1005A of FIG. 13 being disposed between the first distribution bar 905A and the second transportation bar 1005B; and FIG. 14 illustrates a triple bar busway 1400 with a first transportation bar 1005A, a first distribution bar 905A, and a second transportation bar 1005B with the first distribution bar 905A of FIG. 14 being disposed between the first transportation bar 1005A and the second transportation bar 1005B.

Figure 15A:
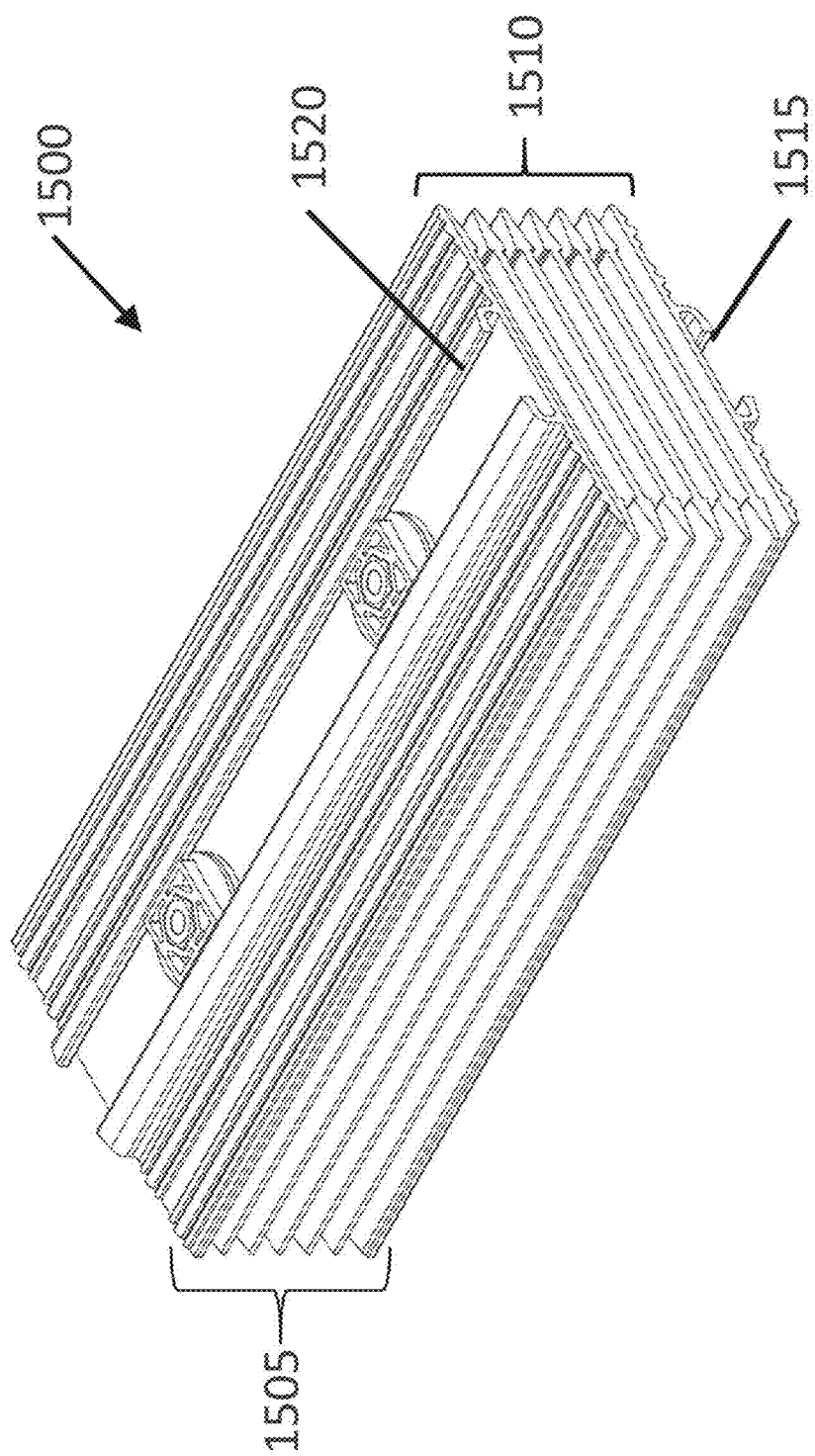
FIGS. 15A and 15B illustrate different conductor assemblies, such as a two bar conductor assembly (FIG. 15A) and a three bar conductor assembly (FIG. 15B), in accordance with various embodiments of the present disclosure.
Figure 15B:
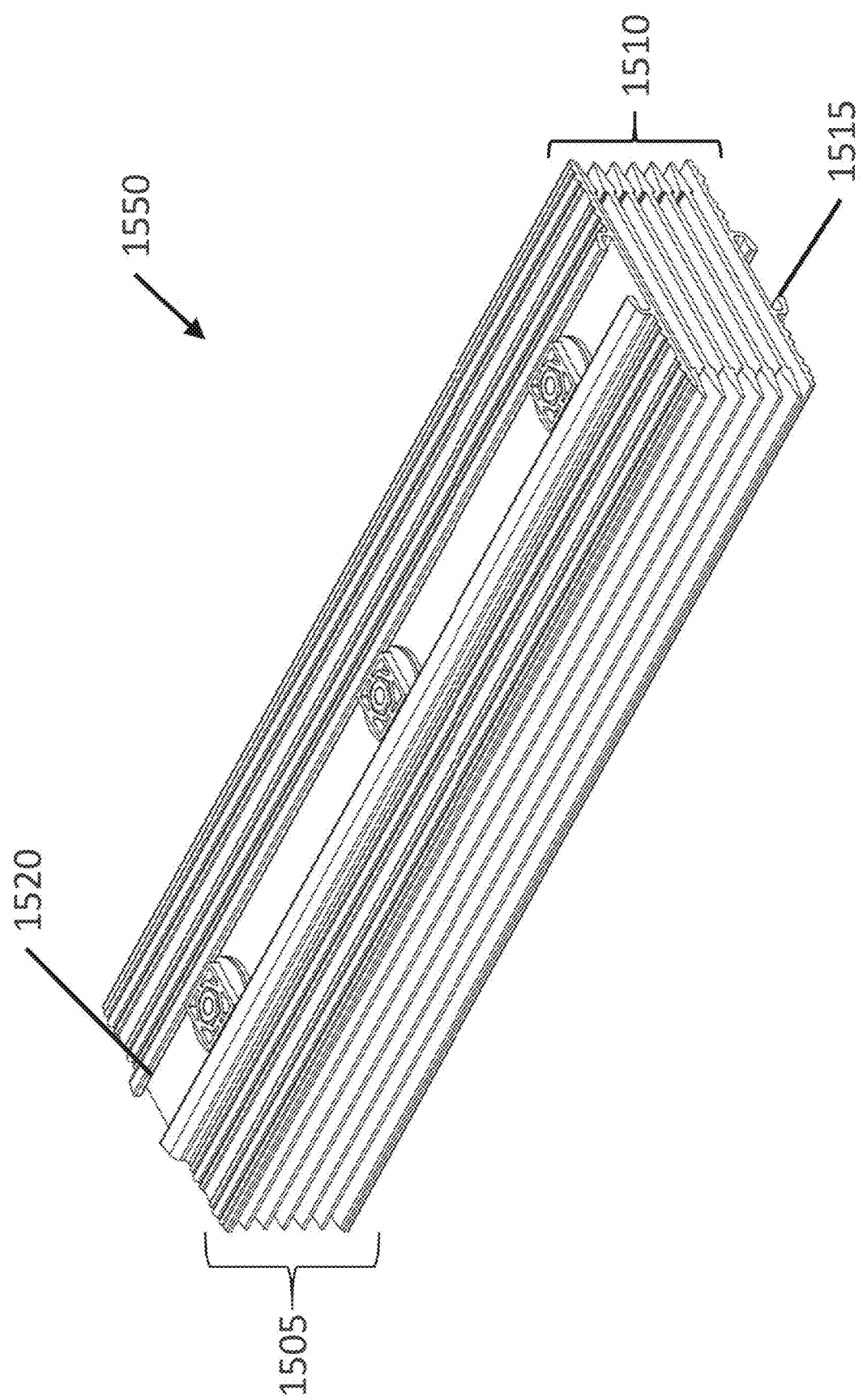

FIGS. 15A and 15B illustrate different conductor assemblies, such as a two bar conductor assembly (FIG. 15A) and a three bar conductor assembly (FIG. 15B), in accordance with various embodiments. The conductor assemblies of FIGS. 15A and 15B are monobloc. Conductor assemblies may be used to connect various electrical components as discussed herein. For example, the conductor assemblies may be used to attached busways to one another (e.g., the busbars 1505 may be connected to one or more bars (e.g., distribution bar(s) and/or transportation bar(s) of a first busway) and the busbars 1510 may be connected to one or more other bars (e.g., distribution bar(s) and/or transportation bar(s) of a second busway). The busbars 1505, 1510 may be connected to various different electrical components discussed herein (e.g., any number of different busbar connections discussed herein).

While double and triple bar conductor assemblies are shown in various embodiments, any number of different sized conductor assemblies may be used herein. In various embodiments, the conductor assemblies may have one or more attachment grooves 1515, 1520 that allow for coupling to a holding structure (e.g., for placement in a building).

Figure 16A:
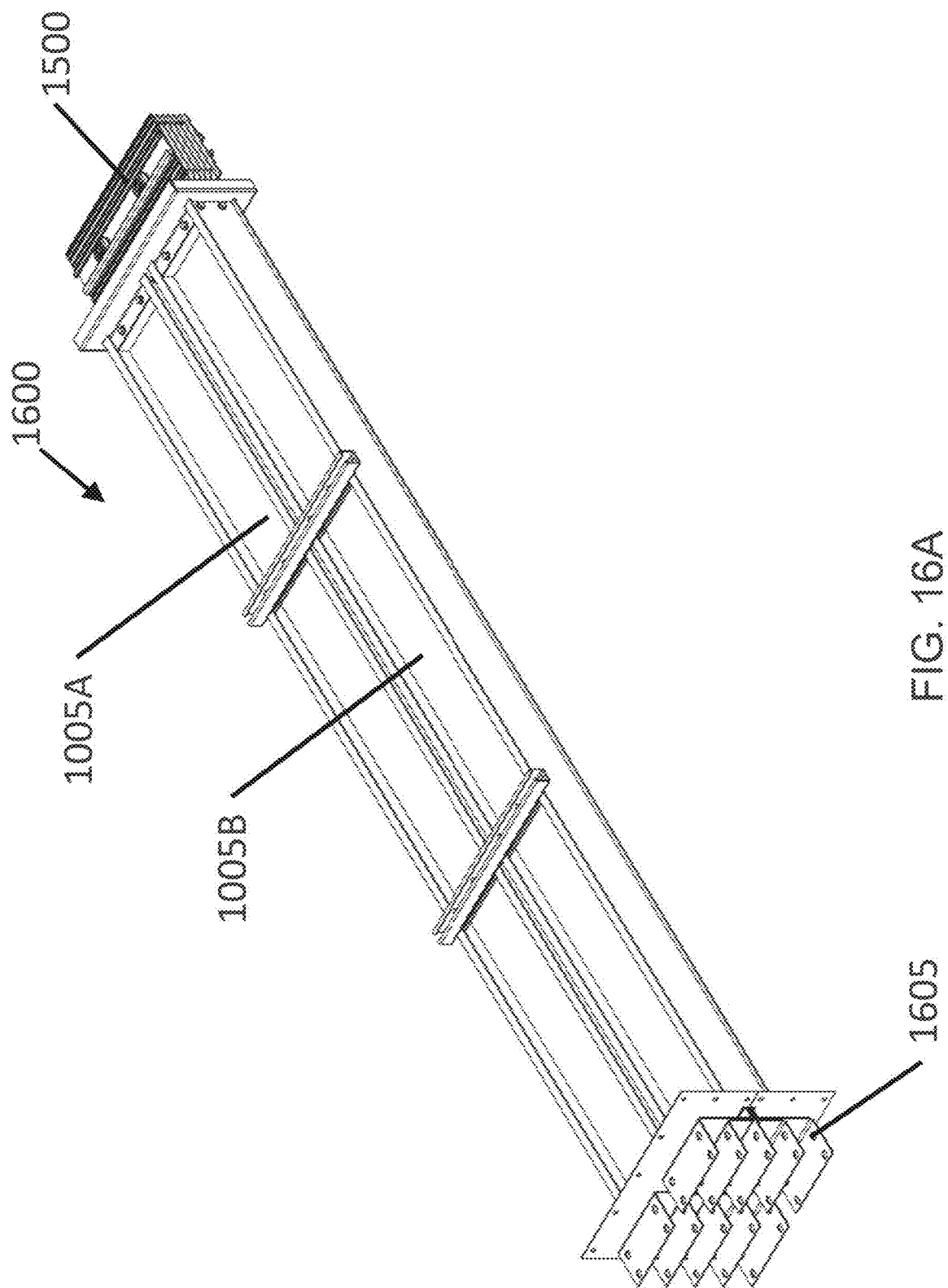
FIGS. 16A and 16B illustrate a double bar feed assembly (FIG. 16A) and a triple bar feed assembly (FIG. 16B), in accordance with various embodiments of the present disclosure.
Figure 16B:
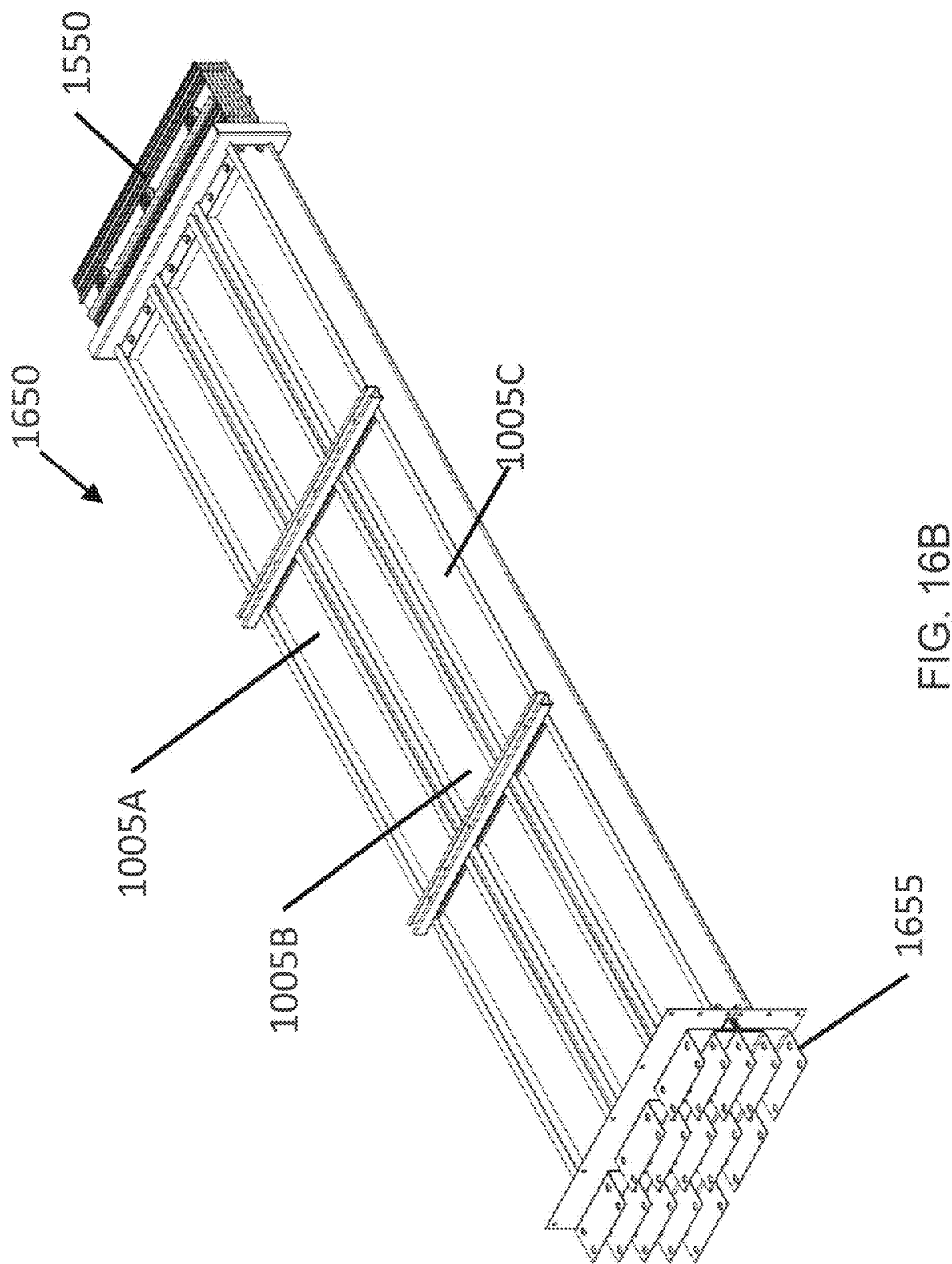

FIGS. 16A and 16B illustrate a double bar feed assembly (FIG. 16A) and a triple bar feed assembly (FIG. 16B), in accordance with various embodiments. The feed assemblies (e.g., double bar feed assembly 1600 and/or triple bar feed assembly 1650) may be used to connect multiple busways to one another. For example, the feed adapter 1605 of the double bar feed assembly 1600 may be connected to another feed adapter of another double bar feed assembly and the feed adapter 1655 of the triple bar feed assembly 1650 may be connected to another feed adapter of another triple bar feed assembly. Different number of bars may be connected using the feed adapter. For example, a single bar feed assembly and a double bar feed assembly may both be connected to the triple bar feed assembly 1650. The feed adapters 1605, 1655 may be used to connect to various different electrical components, as discussed herein.

The feed assemblies of FIGS. 16A and 16B are each illustrated with only transportation bars (e.g., a first transportation bar 1005A and a second transportation bar 1005B in FIG. 16A and a first transportation bar 1005A, a second transportation bar 1005B, and a third transportation bar 1005C in FIG. 16B), but may also use distribution bar(s) in various embodiments.

Figure 17B:
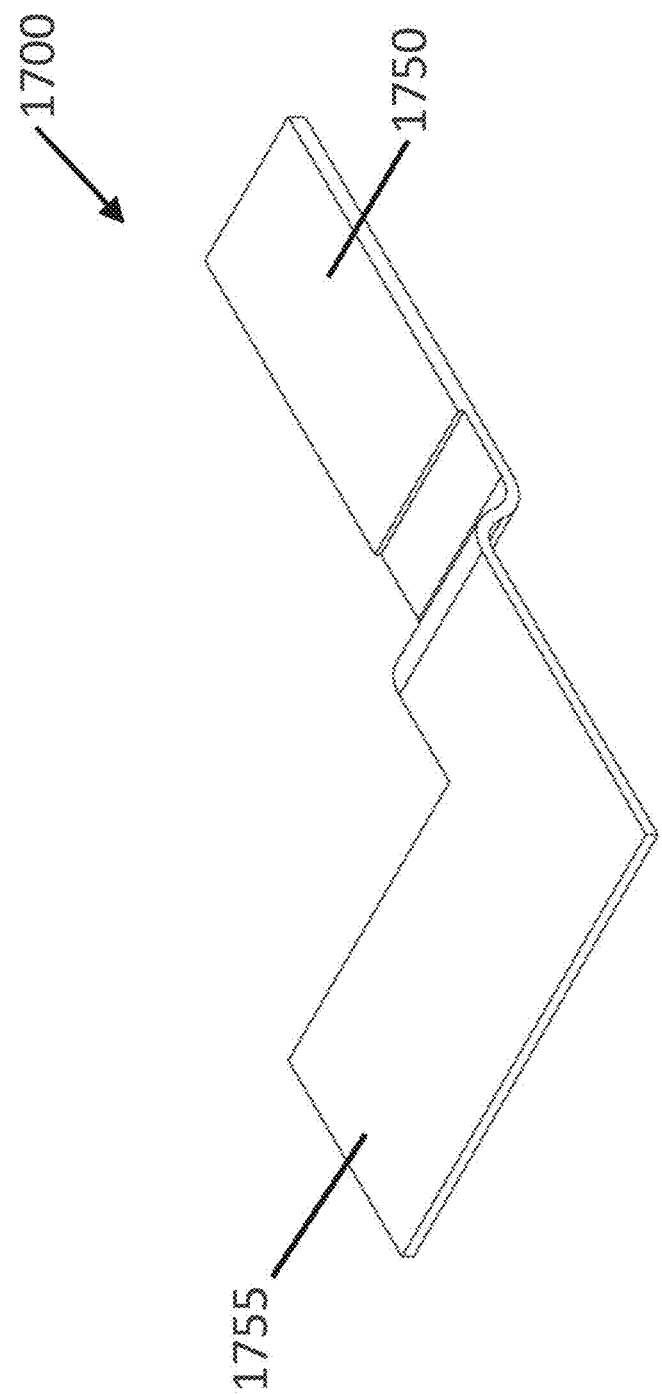

FIGS. 17A and 17B illustrate the joint adapter blades inserted into a distribution bar (FIG. 17A) and individually (FIG. 17B), in accordance with various embodiments. The joint adapter blades 1700A-1700E may be used to connect different electrical components. For example, a joint adapter blade may be used to connect bars (e.g., transportation bar and/or distribution bar) to conductor assemblies (e.g., double bar conductor assembly 1500, triple bar conductor assembly 1550, etc.). As shown in FIG. 17A, the joint adapter blades 1700A-1700B may be connected to the busbars of the distribution bar (e.g., busbar ports 1900 of the first distribution bar 905A shown in FIG. 19).

The joint adapter blades 1700A-1700E may be structure in a similar fashion as the joint adapter blade 1700 shown in FIG. 17B. The joint adapter blade 1700 may be at least partially made out of a conductive material (e.g., aluminum, copper, gold, silver, etc.). In various embodiments, the joint adapter blade 1700 may have an L-shape. The joint adapter blade 1700 may include an insertion portion 1750 and a connector portion 1755. The insertion portion 1750 of the joint adapter blade 1700 may be the portion of the joint adapter blade 1700 that is inserted into a busbar (e.g., as shown in FIG. 17A). The connector portion 1755 may be connected to other electrical components (e.g., other busbars) in order to transfer the electrical current. In various embodiments, the joint adapter blade may be a U-shape with two insertion portions. As shown in FIG. 17A, multiple joint adapter blades 1700A-1700E may be used to conduct and/otherwise transfer electricity.

Figure 18:
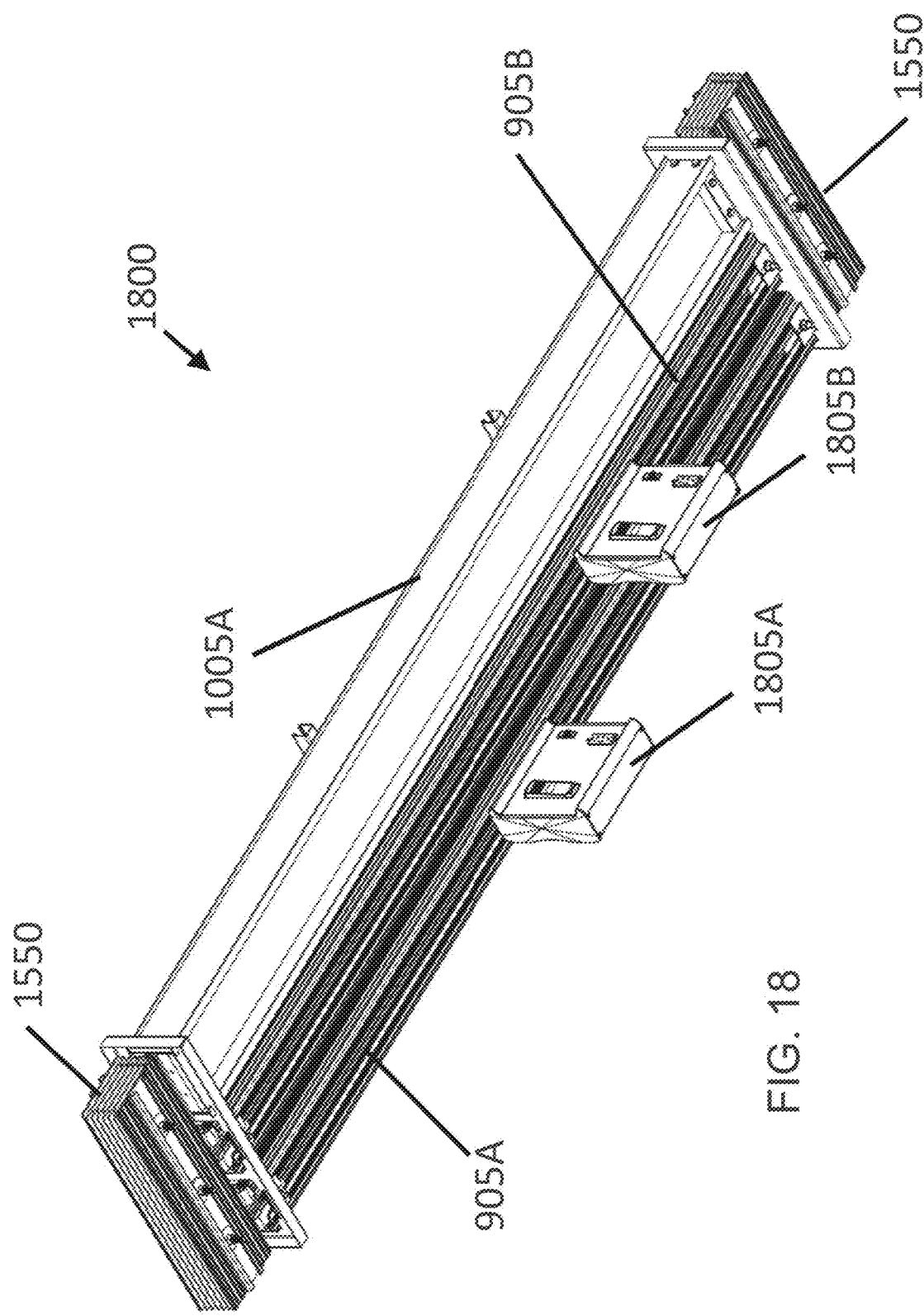
FIG. 18 illustrates a triple bar busway with power tap-off units positioned along distribution bars, in accordance with various embodiments of the present disclosure.

FIG. 18 illustrates a triple bar busway with power tap-off units positioned along distribution bars, in accordance with various embodiments. While the power tap-off units are shown with a triple bar busway, any number of power tap-off units (or other powered units) may be used in an instance in which one or more distribution bars are provided. As shown, the triple bar busway 1800 includes a first distribution bar 905A, a second distribution bar 905B, and a transportation bar 1005A with a first power tap-off unit 1805A connected to the first distribution bar 905A and a second power tap-off unit 1805B connected to the second distribution bar 905B. Any number of units that use power may be connected to a distribution bar, as the power tap-off units are connected in FIG. 18.

Figure 19:
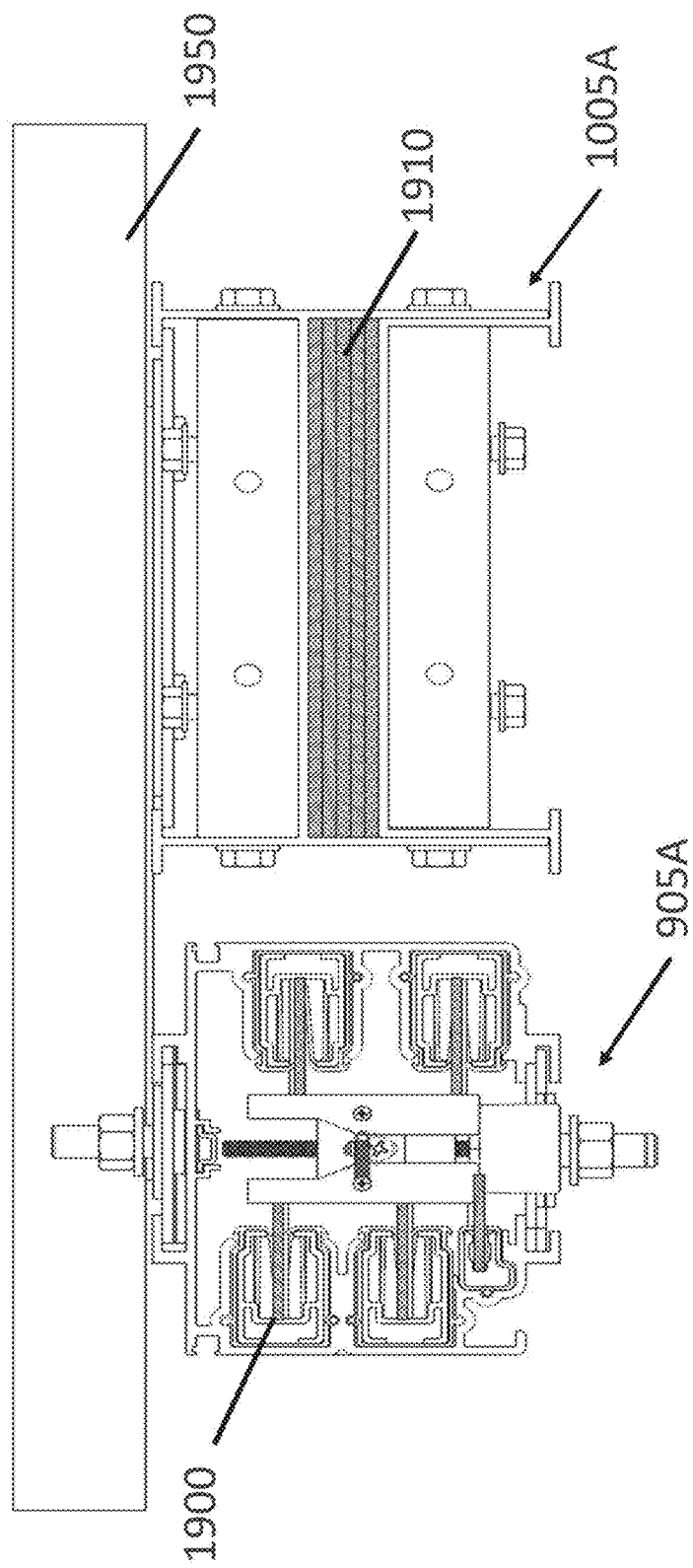
FIG. 19 is a side view of a double bar busway with a first distribution bar 905A and a first transportation bar 1005A, in accordance with various embodiments of the present disclosure.

FIG. 19 is a side view of a double bar busway with a first distribution bar 905A and a first transportation bar 1005A, in accordance with various embodiments. The electrical bars shown in FIG. 19 are illustrative of any bar discussed in the present disclosure. As discussed herein, the first distribution bar 905A may include one or more busbar ports 1900 that receive electrical connectors, such as the joint adapter blade 1700 shown in FIGS. 17A and 17B. The first transportation bar 1005A may also include one or more busbar ports 1910 that receive electrical connectors. While the first distribution bar and first transportation bar of FIG. 19 are shown with busbar ports, any electrical bar discussed herein may have unitary connector probes (e.g., the joint adapter blade may be unitary with the given electrical bar). In the embodiment shown in FIG. 19, the first distribution bar 905A includes a press-in joint expanding joint blade retainer. In various embodiments, a busway support 1950 may be provided to support the assembly therein.

In various embodiments, a high-amperage busbar assembly is provided that includes an open channel distribution busbar trunk connected in parallel with one or more other busbar trunks. The other busbar trunks are either an open channel distribution type or a sandwich busway type. The high-amperage busway assembly may include a plurality of stab members is rated for 100A or more.

In various embodiments, a busway joiner may be used to connect open channel busway to a closed housing busway. A busway joiner can connect any combination of compatible busbar trunking sections. Busway tap off units may be compatible with a T5 busbar trunking system.

Flange plates are added to existing components for the purpose of component alignment, electrical safety and ingress protection. Conductive adapter blades which are inserted in the conductors of the open channel BTS protrude from both ends of the BTS and are mated to the BTS joiner (monobloc).

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described, and other implementations, enhancements and variations can be made based on what is described and illustrated in this patent document.

CLAIM CLAUSES

Clause 1. A high-amperage busbar assembly, the assembly comprising: a first conductor assembly; two or more electrical bar trunks, wherein the two or more electrical bar trunks are each either a distribution bar or a transportation bar, wherein the two or more electrical bar trunks are electrically connected to the first conductor assembly at a first end of each of the two or more electrical bar trunks; and a second conductor assembly, wherein each of the two or more electrical bar trunks are electrically connected to the second conductor assembly at a second end of each of the two or more electrical bar trunks.

Clause 2. The assembly of Clause 1, wherein the two or more electrical bar trunks are connected to one another in parallel.

Clause 3. The assembly of Clause 1, wherein each of the first conductor assembly the second conductor assembly are sized to receive two electrical bar trunks.

Clause 4. The assembly of Clause 1, wherein each of the first conductor assembly the second conductor assembly are sized to receive two electrical bar trunks.

Clause 5. The assembly of Clause 1, wherein at least one of the two or more electrical bar trunks are a distribution bar.

Clause 6. The assembly of Clause 5, wherein the distribution bar is an open channel distribution trunk.

Clause 7. The assembly of Clause 5, further comprising one or more powered unit attached to the distribution bar between the first conductor assembly and the second conductor assembly.

Clause 8. The assembly of Clause 1, further comprising one or more joint adapter blade connecting the first conductor assembly to the two or more electrical bar trunks.

Clause 9. The assembly of Clause 1, wherein at least one of the first conductor assembly or the second conductor assembly is attached to another busbar assembly.

Clause 10. The assembly of Clause 1, wherein the assembly is rated for at least 1600A.

Clause 11. A method of manufacturing a high-amperage busbar assembly, the method comprising: providing a first conductor assembly; electrically connecting two or more electrical bar trunks to the first conductor assembly, wherein the two or more electrical bar trunks are each either a distribution bar or a transportation bar, wherein the two or more electrical bar trunks are electrically connected to the first conductor assembly at a first end of each of the two or more electrical bar trunks; and electrically connecting a second conductor assembly to the two or more electrical bar trunks, wherein each of the two or more electrical bar trunks are electrically connected to the second conductor assembly at a second end of each of the two or more electrical bar trunks.

Clause 12. The method of Clause 11, wherein the two or more electrical bar trunks are connected to one another in parallel.

Clause 13. The method of Clause 11, wherein each of the first conductor assembly the second conductor assembly are sized to receive two electrical bar trunks.

Clause 14. The method of Clause 11, wherein each of the first conductor assembly the second conductor assembly are sized to receive two electrical bar trunks.

Clause 15. The method of Clause 11, wherein at least one of the two or more electrical bar trunks are a distribution bar.

Clause 16. The method of Clause 15, wherein the distribution bar is an open channel distribution trunk.

Clause 17. The method of Clause 15, further comprising attaching one or more powered unit to the distribution bar between the first conductor assembly and the second conductor assembly.

Clause 18. The method of Clause 11, further comprising connecting one or more joint adapter blade to the first conductor assembly to the two or more electrical bar trunks.

Clause 19. The method of Clause 11, wherein at least one of the first conductor assembly or the second conductor assembly is attached to another busbar assembly.

Clause 20. The method of Clause 11, wherein the assembly is rated for at least 1600A.

Clause 21. A high-amperage busbar assembly, comprising: an outer component having a first cavity and a second cavity that horizontally abuts the first cavity, wherein the outer component is disposed along a longitudinal axis, wherein the first cavity includes a first inner component parallel to the longitudinal axis, the first inner component adapted to engage a plurality of plates, wherein the second cavity includes a second inner component parallel to the longitudinal axis, the second inner component adapted to engage a plurality of stab members of one or more plug-in units, and wherein the first inner component and the second inner component are electrically coupled.

Clause 22. The high-amperage busbar assembly of clause 21, wherein each of the plurality of stab members is rated for 800A or more.

Clause 23. The high-amperage busbar assembly of clause 21, wherein the outer component is formed from extruded aluminum.

Clause 24. The high-amperage busbar assembly of clause 23, wherein the first and second inner components are formed from aluminum or copper strip material.

Clause 25. The high-amperage busbar assembly of clause 24, wherein a thickness of the copper strip material ranges from 0.030 inches to 0.065 inches.

Clause 26. The high-amperage busbar assembly of clause 23, wherein the first inner component and second inner component are formed from aluminum.

Clause 27. A high-amperage busway, comprising: a trunking bus; and a continuous access busway that horizontally abuts the trunking bus.

Clause 28. A high-amperage electric power distribution track, comprising: an elongated metal enclosure; an elongated first track section within the elongated metal enclosure, the elongated first track section configured to carry a high-amperage current; and an elongated second track section within the elongated metal enclosure and electrically coupled to the elongated first track section, wherein the elongated second track section is configured to engage a plug-in unit, and wherein the plug-in unit is configured to supply the high-amperage current to one or more devices electrically coupled to the plug-in unit.

Clause 29. The high-amperage electric power distribution track of clause 28, wherein the elongated metal enclosure is formed from extruded aluminum.

Clause 30. The high-amperage electric power distribution track of clause 28, wherein the elongated second track section is electrically coupled to the elongated first track section via one or more electrically conductive connector bars.

Clause 31. The high-amperage electric power distribution track of clause 28, wherein the elongated first track section is physically connected to the elongated second track section.

Clause 32. A high-amperage busway as shown and described in this patent document.

The invention claimed is:

1. A high-amperage busbar assembly, the assembly comprising:
   a first conductor assembly;
   two or more electrical bar trunks electrically connected to the first conductor assembly at a first end of each of the two or more electrical bar trunks, wherein at least one of the two or more electrical bar trunks is a distribution bar;
   one or more powered unit(s) attached to the distribution bar between the first conductor assembly and the second conductor assembly; and
   a second conductor assembly, wherein each of the two or more electrical bar trunks are electrically connected to the second conductor assembly at a second end of each of the two or more electrical bar trunks.

2. The assembly of claim 1, wherein the two or more electrical bar trunks are connected to one another in parallel.

3. The assembly of claim 1, wherein each of the first conductor assembly and the second conductor assembly are sized to receive two electrical bar trunks.

4. The assembly of claim 1, wherein the distribution bar is an open channel distribution trunk.

5. The assembly of claim 1, wherein at least one of the first conductor assembly or the second conductor assembly is attached to another busbar assembly.

6. The assembly of claim 1, wherein the assembly is rated for at least 1600A.

7. A method of manufacturing a high-amperage busbar assembly, the method comprising:
   providing a first conductor assembly;
   electrically connecting two or more electrical bar trunks to the first conductor assembly at a first end of each of the two or more electrical bar trunks, wherein at least one of the two or more electrical bar trunks is a distribution bar;
   electrically connecting a second conductor assembly to the two or more electrical bar trunks, wherein each of the two or more electrical bar trunks are electrically connected to the second conductor assembly at a second end of each of the two or more electrical bar trunks; and
   attaching one or more powered unit(s) to the distribution bar between the first conductor assembly and the second conductor assembly.

8. The method of claim 7, wherein the two or more electrical bar trunks are connected to one another in parallel.

9. The method of claim 7, wherein each of the first conductor assembly and the second conductor assembly are sized to receive two electrical bar trunks.

10. The method of claim 7, wherein the distribution bar is an open channel distribution trunk.

11. The method of claim 7, wherein at least one of the first conductor assembly or the second conductor assembly is attached to another busbar assembly.

12. The method of claim 7, wherein the assembly is rated for at least 1600A.

13. A high-amperage busbar assembly, the assembly comprising:
   a first conductor assembly;
   two or more electrical bar trunks electrically connected to the first conductor assembly at a first end of each of the two or more electrical bar trunks, wherein the two or more electrical bar trunks are each either a distribution bar or a transportation bar;
   one or more joint adapter blade(s) connecting the first conductor assembly to the two or more electrical bar trunks; and
   a second conductor assembly, wherein each of the two or more electrical bar trunks are electrically connected to the second conductor assembly at a second end of each of the two or more electrical bar trunks.

14. A method of manufacturing a high-amperage busbar assembly, the method comprising:
   providing a first conductor assembly;
   electrically connecting two or more electrical bar trunks to the first conductor assembly at a first end of each of the two or more electrical bar trunks, wherein at least one of the two or more electrical bar trunks is a distribution bar;
   electrically connecting a second conductor assembly to the two or more electrical bar trunks, wherein each of the two or more electrical bar trunks are electrically connected to the second conductor assembly at a second end of each of the two or more electrical bar trunks; and
   connecting one or more joint adapter blade from the first conductor assembly to the two or more electrical bar trunks.

* * * * *